United States Patent
Yamada

(10) Patent No.: US 9,344,643 B2
(45) Date of Patent: May 17, 2016

(54) IMAGE PROCESSING APPARATUS, METHOD AND PROGRAM

(71) Applicant: Sony Corporation, Tokyo (JP)

(72) Inventor: Hideshi Yamada, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/386,942

(22) PCT Filed: Mar. 21, 2013

(86) PCT No.: PCT/JP2013/057994
§ 371 (c)(1),
(2) Date: Sep. 22, 2014

(87) PCT Pub. No.: WO2013/146508
PCT Pub. Date: Oct. 3, 2013

(65) Prior Publication Data
US 2015/0304573 A1    Oct. 22, 2015

(30) Foreign Application Priority Data

Mar. 30, 2012  (JP) ................................. 2012-080973

(51) Int. Cl.
*H04N 9/74* (2006.01)
*H04N 5/262* (2006.01)
*G06T 3/00* (2006.01)
*G06T 5/50* (2006.01)

(52) U.S. Cl.
CPC ............ *H04N 5/2625* (2013.01); *G06T 3/0093* (2013.01); *G06T 5/50* (2013.01); *H04N 5/262* (2013.01)

(58) Field of Classification Search
CPC ......... H04N 5/262; H04N 5/91; H04N 5/232; H04N 1/387; H04N 5/2628; H04N 5/265; H04N 9/74; H04N 9/76; G06T 3/00; G06T 3/0093

USPC .......... 348/578, 584, 588, 598, 599; 345/629, 345/630, 634, 635, 638
IPC ................................................ H04N 9/74,9/76
See application file for complete search history.

(56) References Cited

U.S. PATENT DOCUMENTS

2009/0122081 A1    5/2009   Tsubaki et al.
2012/0044260 A1*   2/2012   Hirai .................. H04N 13/0018
                                                                345/629

FOREIGN PATENT DOCUMENTS

JP      2003-216975 A     7/2003
WO   WO 2007/129367 A1   11/2007

OTHER PUBLICATIONS

Schodl et al., Video Textures. SIGGRAPH '00 Proceedings of the 27th Annual Conference on Computer graphics and interactive techniques. 2000:489-498.

*Primary Examiner* — Sherrie Hsia
(74) *Attorney, Agent, or Firm* — Hazuki International, LLC

(57) ABSTRACT

The application relates to an image processing apparatus, a method and a program to obtain a higher quality looped moving image. A transition source frame row and a transition destination frame row are extracted from an input element moving image, and several partial frames rows with different lengths are extracted from the transition destination frame row. A pair of frames that mutually correspond to one another are determined by performing DP matching of a transition source frame row and a partial frame row, and a frame row of a transition period is created, in which a transition from an image of the transition source frame row to an image of the transition destination frame row is performed, by blending an image of each frame pair. A looped moving image is created on the basis of the element moving image and the frame row of the transition period.

9 Claims, 11 Drawing Sheets

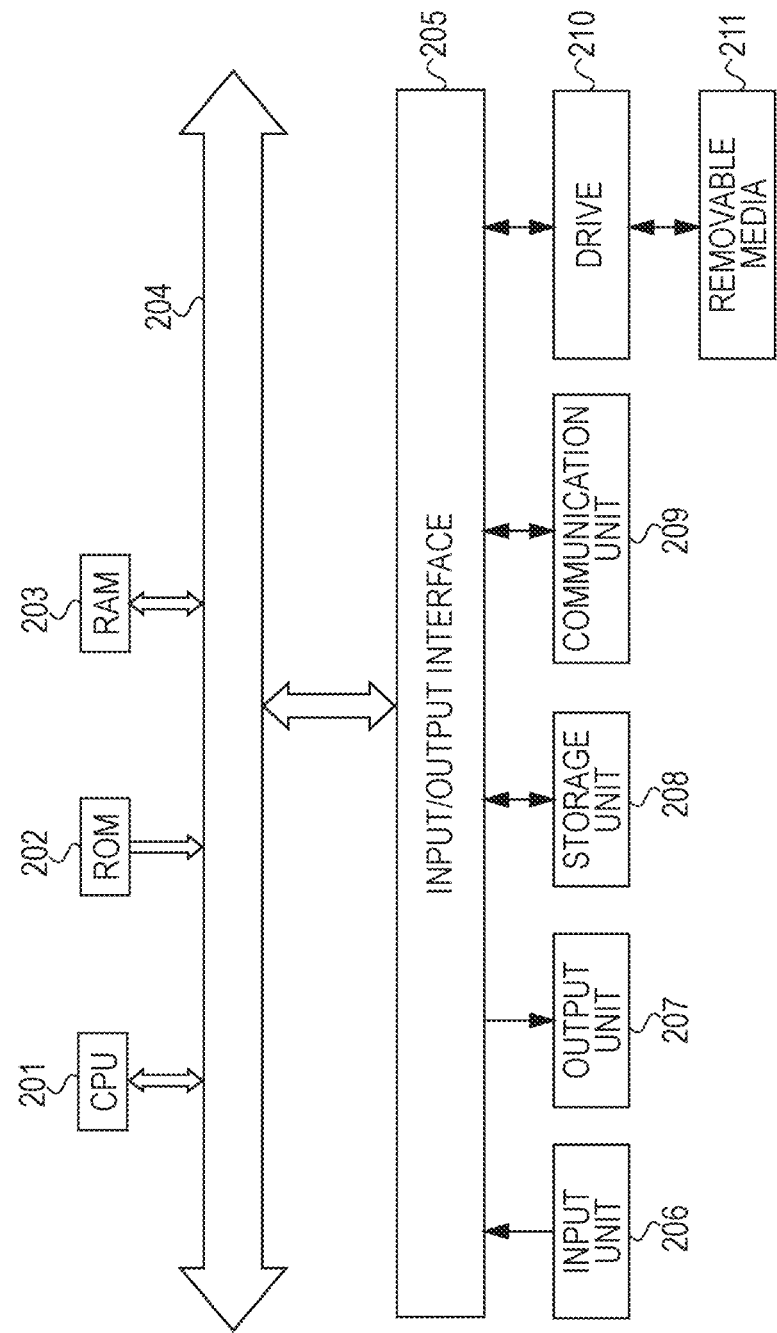

IMAGE PROCESSING APPARATUS, METHOD AND PROGRAM

TECHNICAL FIELD

The present technology relates to an image processing apparatus, a method and a program, in particular, the technology relates to an image processing apparatus, a method and a program that are configured so as to be capable of obtaining a higher quality of looped moving image.

BACKGROUND ART

For example, a video texture technique that creates and presents looped moving images from video image raw material, is known. The video texture technique is a method that creates looped moving images by performing image processing so that a joining point of a repeating image does not stand out in a case in which video raw material of a few seconds is repeatedly reproduced.

This kind of looped moving image can present a video image as if it were a video image of infinite length by reproducing a terminal frame and an initial frame of a looped moving image seamlessly during reproduction with a video image on which one repeat's worth of images are stored. In addition, since it is sufficient to save only one repeat's worth of video image data, the looped moving image can save on storage quantity and transmission time.

For example, provided an image has periods such as a view of water flowing over a waterfall or flags flying in the wind, by repeatedly reproducing the image as a looped moving image, it is also possible for an observer to view the image without a sense of incongruity. Therefore, the looped moving image is suitable for applications such as viewing on digital photo frames, advertisement moving images for websites, and scenery moving images for personal computer screens.

As a method that automatically creates the looped moving images, for example, the video texture technique that is disclosed in NPL1, is known. In the video texture technique a reproduction interval for the repetition of the looped moving image and a transition frame image are calculated automatically.

More specifically, with respect to each frame image that is included in a video image, the degree of similarity of two arbitrary frame images is calculated. Further, a pair of frame images with the highest calculated degree of similarity is configured as an in point and an out point of the repeated reproduction, and a looped moving image is created so as to be repeatedly reproduced between the two points. At this time, in transition periods that are before and after the in point and the out point, video image crossfade processing is performed so that the joining point of the in point and the out point does not stand out.

CITATION LIST

Non Patent Literature

NPL 1: Video Textures; Arno Schodl, Richard Szeliski, David H. Salesin, Irfan Essa; Proceedings of SIGGRAPH 2000; pages 489-498, July 2000

SUMMARY OF INVENTION

Technical Problem

However, in the abovementioned technology, there are cases in which it is not possible to obtain a looped moving image of a sufficiently high quality.

For example, in a case in which a video image, in which non-periodic movement in included, is configured as the raw material of a looped moving image in the abovementioned video texture technique, since an in point and an out point with a high degree of similarity cannot be found, the joining point during repeated reproduction becomes clear, and the result is not preferable. Therefore, a method of creating looped moving images that can handle a larger variety of video image raw materials is desirable.

The present technology has been devised in view of such circumstance, and is configured to be capable of obtaining a higher quality of looped moving image.

Solution to Problem

According to an aspect of the present technology, there is provided an image processing apparatus that creates a transition moving image in which, among a first moving image and a second moving image, an image transitions from one to the other, the image processing apparatus including a matching processing unit that searches for frame pairs of the first moving image and the second moving image which have similar images, on the basis of a level of similarity between images of frames that configure the first moving image and images of frames that configure the second moving image, a repositioning processing unit that repositions a plurality of the frame pairs in a time direction, which are lined up in time series, on the basis of a time lag of frames of the first moving image and a time lag of frames of the second moving image of mutually adjacent frame pairs, and a blending processing unit that creates the transition moving image by configuring an image of each frame that configures the repositioned frame pairs as an image of a frame of the transition moving image through blending thereof.

The frames of the first moving image and the frames of the second moving image of the plurality of the frame pairs, which are lined up in time series, may respectively be lined up in a time series of ascending order or descending order.

The repositioning processing unit may perform the repositioning so that mutually adjacent frame pairs are positioned with a time lag that is obtained by adding a time lag of frames of the first moving image and a time lag of frames of the second moving image of mutually adjacent frame pairs with weightings.

The weighting of the time lag of frames of the first moving image that is used in the weighted addition may be set as an average value of the weighting of each frame of the first moving image of mutually adjacent frame pairs, and the weighting of each frame of the first moving image may be established so as to be as large as frames that are on a leading side of the first moving image.

When a reproduction speed of the second moving image with respect to the first moving image is changed with a predetermined frame pair as a point of origin, the matching processing unit may configure any one of several pairs of reproduction speed frames as the frame pair that is adjacent to the predetermined frame pair, on the basis of the level of similarity between a pair of frames of the first moving image and the second moving image that should be presented at the same time.

The matching processing unit may calculate the plurality of frame pairs, which are lined up in time series, for a plurality of first moving images with mutually different lengths, and the blending processing unit may create the transition moving image using a frame pair, among the plurality of frame pairs that were calculated for each first moving image, in which an evaluation based on the level of similarity for each frame is the highest.

The image processing apparatus may further include a looped moving image creation unit that creates a looped moving image on the basis of the transition moving image.

According to another aspect of the present technology, there are provided an image processing method and a program that create a transition moving image in which, among a first moving image and a second moving image, an image transitions from one to the other, the image processing method and the program including the steps of searching for frame pairs of the first moving image and the second moving image which have the similar images, on the basis of a level of similarity between images of frames that configure the first moving image and images of frames that configure the second moving image, repositioning a plurality of the frame pairs in a time direction, which are lined up in time series, on the basis of a time lag of frames of the first moving image and a time lag of frames of the second moving image of mutually adjacent frame pairs, and creating the transition moving image by configuring an image of each frame that configures the repositioned frame pairs as an image of a frame of the transition moving image through blending thereof.

In the aspect of the present technology, in an image process that creates a transition moving image in which, among a first moving image and a second moving image, an image transitions from one to the other, frame pairs of the first moving image and the second moving image which have the similar images, are searched for on the basis of a level of similarity between images of frames that configure the first moving image and images of frames that configure the second moving image, a plurality of the frame pairs, which are lined up in time series, are repositioned in a time direction on the basis of a time lag of frames of the first moving image and a time lag of frames of the second moving image of mutually adjacent frame pairs, and the transition moving image is created by configuring an image of each frame that configures the repositioned frame pairs as an image of a frame of the transition moving image through blending thereof.

Advantageous Effects of Invention

According to the aspects the present technology, it is possible to obtain a higher quality of looped moving image.

BRIEF DESCRIPTION OF DRAWINGS

FIG. 12 is a diagram that shows a configuration example of a computer.

DESCRIPTION OF EMBODIMENTS

Hereinafter embodiments in which the present technology is applied will be described with reference to the drawings.

First Embodiment

Creation of Looped Moving Image

Firstly, the creation of a looped moving image using the video texture technique will be described.

Additionally, in this instance, there is a single moving image (video image) that is the raw material of the looped moving image, and the creation of a looped moving image from within a single moving image is performed by determining an interval that is repeatedly reproduced.

Figure 1:
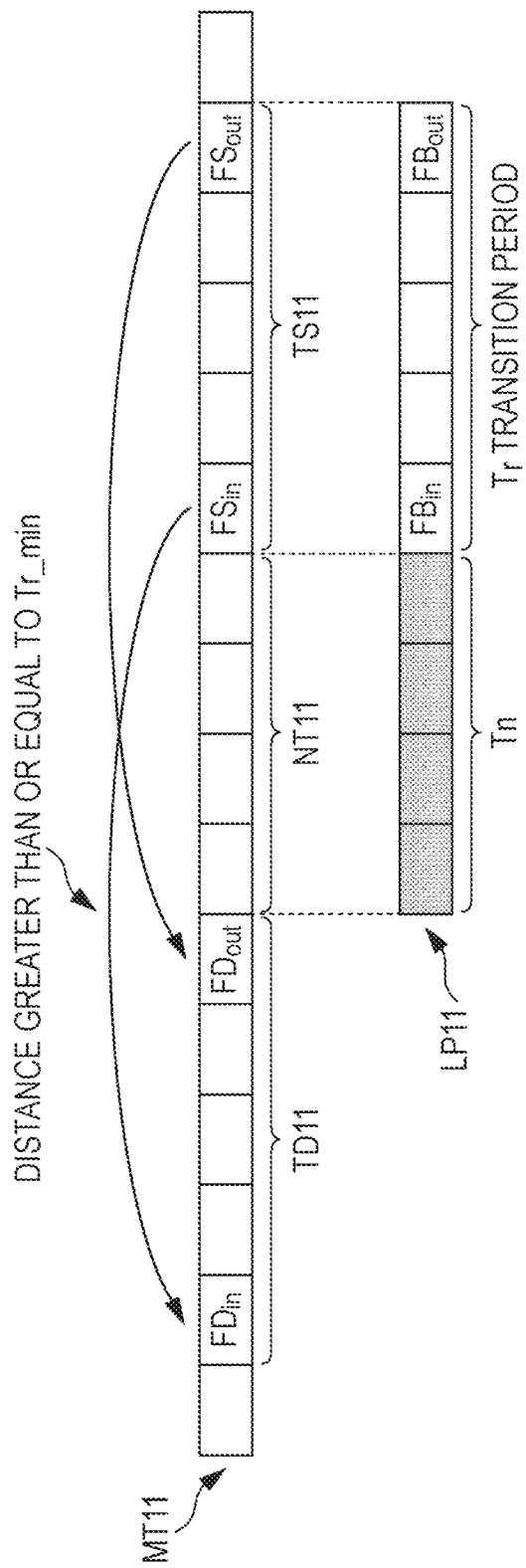
FIG. 1 is a diagram that describes the creation of a looped moving image using a video texture technique.

For example, as shown in FIG. 1, a moving image MT11 is supplied as the raw material, and a looped moving image LP11 is created using the moving image MT11.

Additionally, in FIG. 1, a plurality of rectangles that are within the rectangles that represent the moving image MT11 and the looped moving image LP11 respectively represent an image of a single frame. In addition, in FIG. 1, a frames that is on the left end in the drawing is a frame in which a frame number is smallest, and during normal reproduction, reproduction is performed in order from a frame on the left end to a frame on the right end. For example, a frame on the left end of the moving image MT11 in the drawing is a first frame, and a frame that is adjacent to this frame on the right side is a second frame.

In the video texture technique, a looped moving image is created in a process that has two steps.

Firstly, in the first step, two frame rows, a frame row of a transition source and a frame row of a transition destination, are determined from within the moving image MT11. In other words, a correspondence of an in point and an out point of each frame row (interval) of the transition source and the transition destination, is determined.

In the example of FIG. 1, an interval that is formed from five frames in the moving image MT11 is set as a frame row TS11 of a transition source, and an interval that is formed from five frames in the moving image MT11, which are before the frame row TS11, is set as a frame row TD11 of a transition destination.

In this instance, in the frame row TS11 and the frame row TD11, a leading frame and an ending frame of the frame rows are the respective in point and out point thereof.

That is, in the frame row TS11, a leading frame $FS_{in}$ is the in point, and an ending frame $FS_{out}$ is the out point. In addition, in the frame row TD11, a leading frame $FD_{in}$ is the in point, and an ending frame $FD_{out}$ is the out point.

The frame row TS11 and the frame row TD11 are established so that images of frames that are in the same position of the frame rows are images that are mutually similar to one another. Normally, the frame row TS11 of the transition source is selected from the vicinity of a terminal end of the moving image MT11 that is the raw material, and the frame row TD11 of the transition destination is selected from the vicinity of an initial end of the moving image MT11.

In addition, in the second step, a looped moving image LP11 is created on the basis of image data of an interval from the frame $FD_{in}$ to the frame $FS_{out}$ of the moving image MT11.

More specifically, a blending process is carried out on the frame row TS11 of the transition source and the frame row TD11 of the transition destination, and images of each frame of an interval of the posterior half of the looped moving image LP11, that is, a transition period Tr, are created. In the blending process, images of frames of the frame row TS11 and the frame row TD11 that are in the same position are added with weighting, and are set as the images of each frame of the transition period Tr of the looped moving image LP11.

Therefore, for example, the image of a leading frame $FB_{in}$ of the transition period Tr is an image that is obtained by blending the image of the leading frame $FS_{in}$ of the frame row TS11 of the transition source and the image of the leading frame $FD_{in}$ of the frame row TD11 of the transition destination.

In addition, the image of an ending frame $FB_{out}$ of the transition period Tr of the looped moving image LP11 is an image that is obtained by blending the image of the ending frame $FS_{out}$ of the frame row TS11 of the transition source and the image of the ending frame $FD_{out}$ of the frame row TD11 of the transition destination.

In the transition period Tr that is obtained through this kind of blending process, the images of each frame are images that gradually change (transition) from the images of the frame row TS11 of the transition source to the images of the frame row TD11 of the transition destination.

Furthermore, an interval NT11 that is between the frame $FD_{out}$ and the frame $FS_{in}$ of the moving image MT11 is set as an interval Tn of the anterior half of the looped moving image LP11 without being changed, and a looped moving image LP11 that is formed from the interval Tn and the transition period Tr, is obtained.

During reproduction of the looped moving image LP11, each frame that configures the looped moving image LP11 is repeatedly reproduced by returning to the leading frame of the interval Tn again after reproduction in order from the leading frame of the interval Tn to the ending frame of the transition period Tr.

Additionally, during reproduction of the looped moving image LP11, a number of frames that is required for transition, that is, a number of frames of the transition period Tr is supplied in advance as a parameter. In addition, a minimum looped moving image length Tr_min, that is, a minimum distance limitation of an interval from the frame $FD_{in}$ to the frame $FS_{in}$, which is a minimum length of the looped moving image LP11, is also supplied in advance as a parameter.

Next, a method for determining the in point and the out point of the frame row TS11 of the transition source and the frame row TD11 of the transition destination will be described.

Firstly, a difference value D (i, j) of images is calculated for an image Fi of an arbitrary $i^{th}$ frame i and an image Fj of an arbitrary $j^{th}$ frame j that configure a moving image that is the input raw material. That is, the calculation of the following formula (1) is performed.

[Equation 1]

$$D(i,j) = \Sigma |F_i(x,y) - F_j(x,y)|^2 \ (x,y) \in P \quad (1)$$

Additionally, in formula (1), $F_i(x, y)$ indicates a pixel value of pixels that are in positions (x, y) of the image Fi, and $F_j(x, y)$ indicates a pixel value of pixels that are in positions (x, y) of the image Fj. Therefore, in formula (1), a square value of a difference in pixel value between pixels that are in the same positions of the image Fi and the image Fj is calculated for all of the pixels of the image Fi and the image Fj, and the sum total (an integrated value) of the square values is set as a difference value D (i, j) of the frame i and the frame j.

The difference value D (i, j) indicates a level of similarity between the image Fi of the frame i and the image Fj of the frame j, and the more similar the images are, the smaller the value of the difference value D (i, j) becomes.

During creation of a looped moving image, the difference value D (i, j) is calculated for all of the (i, j) combinations that configure a moving image that is the raw material, and the difference values D (i, j) are saved as a two-dimensional difference value matrix MD.

Figure 2:
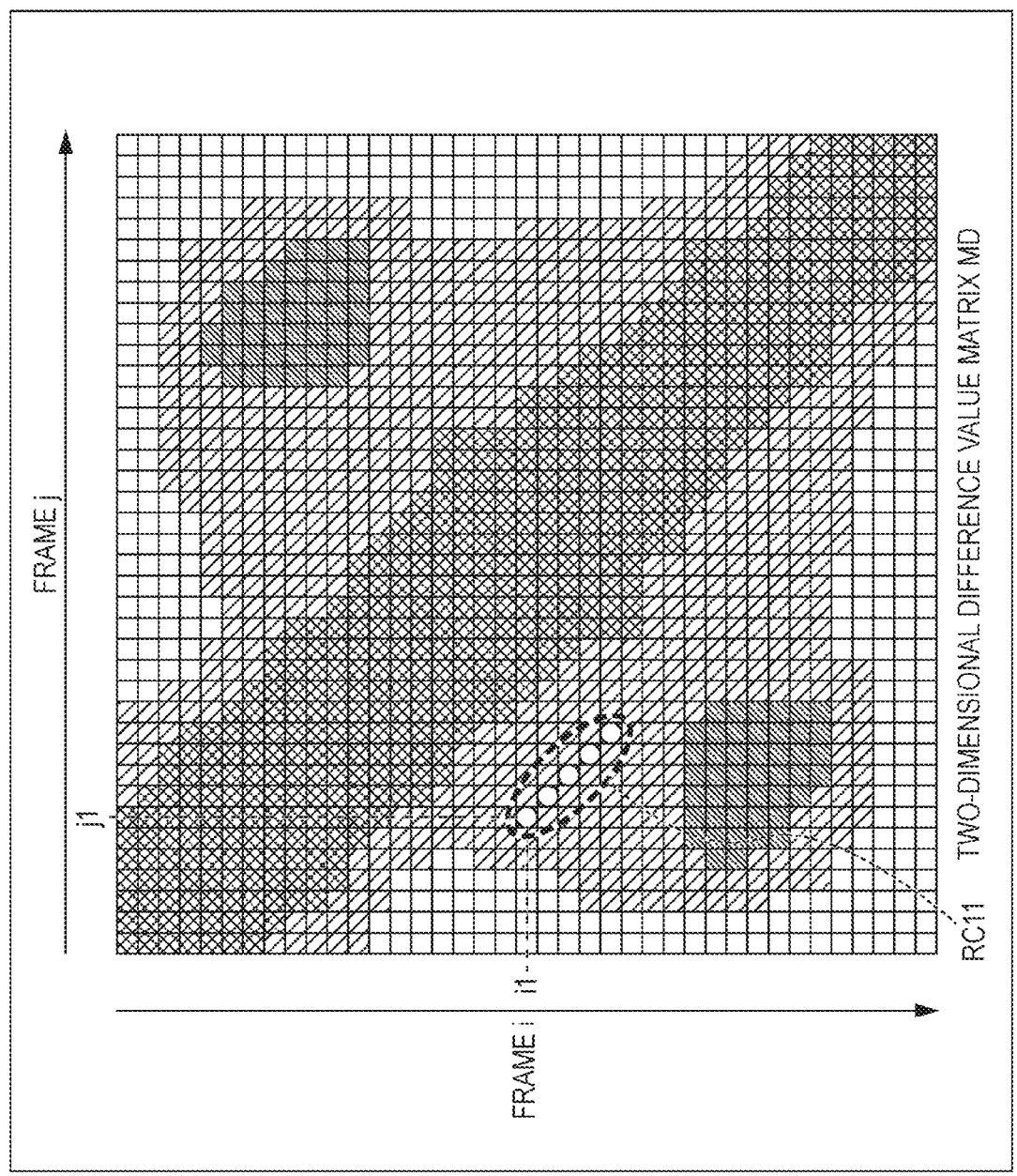
FIG. 2 is a diagram that describes a two-dimensional difference value row.

In this instance, the two-dimensional difference value matrix MD is, for example, a matrix in which, as shown in FIG. 2, the longitudinal direction in the drawing is set as an i axis, the cross direction in the drawing is set as a j axis, and the values of elements of the positions (i, j) are the difference values D (i, j). Additionally, in FIG. 2, each square represents each element of the two-dimensional difference value matrix MD, and the darker the color of the squares that represent the elements are, the lower the value of the element, or in other words, the value of the difference value D (i, j) is.

For example, in each element that is on a diagonal line that runs from the top left to the bottom right of the two-dimensional difference value matrix MD in the drawing, the value (the difference value D (i, j)) of the elements is 0 since the frame i and the frame j are the same frame. In addition, since the frame i and the frame j are frames that configure the same moving image, the two-dimensional difference value matrix MD is symmetrical in relation to a straight line i=j.

When the two-dimensional difference value matrix MD is obtained in this manner, the calculation of the following formula (2) is subsequently performed on element rows that are continuously lined up on the two-dimensional difference value matrix MD, and a transition cost C (i, j) is computed.

[Equation 2]

$$C(i, j) = \sum_{k=0}^{T_r} D(i+k, j+k) \quad (2)$$

Additionally, in formula (2), Tr indicates a number that is 1 less than a number of frames of the transition period Tr that was described with reference to FIG. 1. Therefore, in formula (2), the sum total of the difference values D (i, j) from a position (i, j) to a position (i+Tr, j+Tr) is calculated as the transition cost C (i, j).

For example, in a case in which Tr=4, focusing on a position (i,j)=(i1, j1) in FIG. 2, the sum of the difference values D (i, j), which are the values of each of five elements that are included in a region RC11, becomes the transition cost C (i1, j1) for the position (i1, j1).

In this instance, the element rows that are included in the region RC11 are the rows of five elements that are lined up adjacently in a direction that is diagonally downwards to the right in the drawing with the element of the position (i1, j1) as the leading frame thereof.

For example, if the frame i is the frame $FS_{in}$ in FIG. 1, from the frame i to a frame (i+Tr) becomes the frame $FS_{in}$ to the frame $FS_{out}$ that respectively configure the frame row TS11. In addition, if the frame j is the frame $FD_{in}$ in FIG. 1, from the frame j to a frame (j+Tr) becomes the frame $FD_{in}$ to the frame $FD_{out}$ that respectively configure the frame row TD11.

In this case, the transition cost C (i, j) for the position (i, j) is the sum total of the difference values D (i, j) of frames that are in the same positions in the frame row TS11 and the frame row TD11.

Therefore, the transition cost C (i, j) can be said to indicate the level of similarity between the frame row TS11 and the frame row TD11. Therefore, if the position (i, j) at which the transition cost C (i, j) is smallest is calculated, and an interval that has that frame as the leading frame thereof is set as the frame row of the transition source and the transition destination, it is possible to obtain a looped moving image in which it is unlikely that the joining point stands out.

In such an instance, during creation of a looped moving image, among each position (i, j), the position (i, j) at which the transition cost C (i, j) is smallest, is calculated, and frames i and j that are indicated by the obtained position (i, j) are set as the frames $FS_{in}$ and $FD_{in}$, which are respectively in points.

Additionally, to explain in more detail, among each position (i, j) of the two-dimensional difference value matrix MD, a region that is established by the minimum looped moving image length Tr_min, or more specifically, a region in the vicinity of elements in which i=j, are excluded from the detection of the position (i, j) at which the transition cost C (i, j) is smallest.

In addition, in the video texture technique, during calculation of the transition cost C (i, j), rather than simply integrating the difference values D (i, j) of the positions, a method that sets a weighted integrated value of the difference values D (i, j), to which a weighting that has an intermediate position between the in point and the out point as the maximum value thereof and that gradually decreases toward both end points has been added, as the transition cost C (i, j) has been suggested.

Meanwhile, in the video texture technique that has been described above, similar frame rows are searched for and output from a moving image that is input as a raw material, and are set as a transition point for repetition, that is, the in point and the out point, but it is rare for the images of two frame rows to conform with one another in an image in a practical sense.

For example, there are cases in which the speeds of movements differ even in cases of movements in which the movements of a photographic subject are similar in two intervals within a moving image that is the raw material, cases in which periodic movements are not included in a moving image that is the raw material in the first place, and the like. In such a case, even if a looped moving image is created from the moving image that is the raw material, during repeated reproduction of the looped moving image, it is possible to clearly recognize the joining point of the leading frame and the ending frame.

Therefore, in order to obtain a higher quality of looped moving image, provided the speed of movement of a photographic subject differs in the two similar intervals of the moving image that are the raw materials, it is preferable to determine a transition point that also takes speed into consideration, and perform a blending process on the image of each frame. In addition, even if the movement of a photographic subject is not periodic, provided a case in which the moving image is reproduced in reverse is also included as a candidate of the frame rows of the transition source and the transition destination, there is a possibility that a more suitable transition source will be found.

In this instance, if a reproduction speed that is taken into consideration is set as a N times speed, the former corresponds to case in which the reproduction speed is increased, decreased or the like, or in other words, a case of considering speeds at which N is 0 or more, and it is possible to consider the reverse reproduction of the latter as cases in which N is negative.

Figure 3:
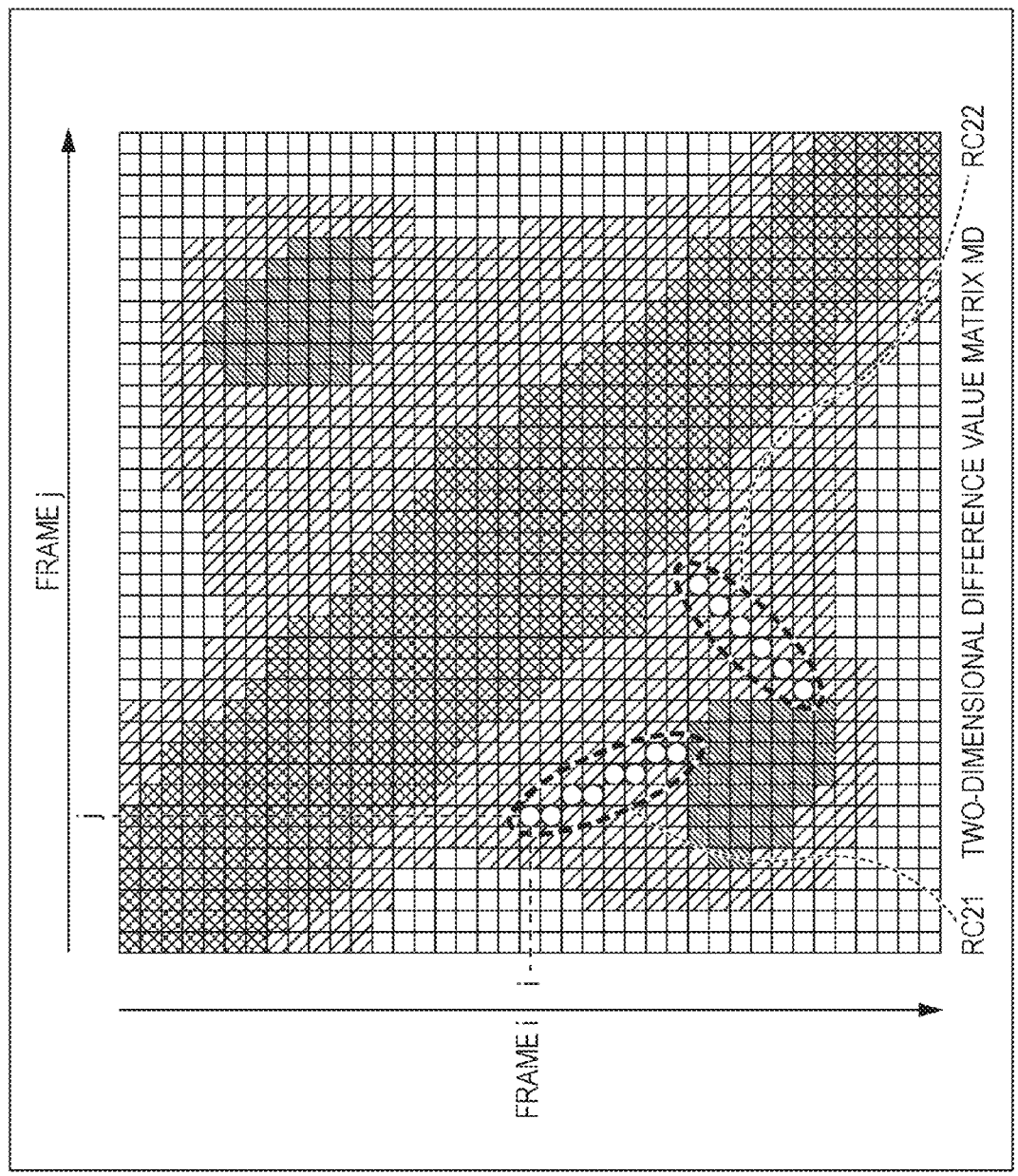
FIG. 3 is a diagram that describes a two-dimensional difference value row and a transition cost.

For example, as shown in FIG. 3, in the expression in the two-dimensional difference value matrix MD, the transition cost C (i, j) of frame rows that are not reproduced by a normal speed corresponds to the integration of difference values D (i, j) of elements that are lined up in a direction that is not 45° diagonally down to the right in the drawing. In addition, the transition cost C (i, j) of reverse reproduction frame rows corresponds to the integration of difference values D (i, j) of elements that are lined up in a diagonally left down direction in the drawing.

Additionally, in FIG. 3, the longitudinal direction and the cross direction respectively indicate an i axis direction and a j axis direction, and in FIG. 3, the same two-dimensional difference value matrix MD as that indicated in FIG. 2 is indicated.

For example, in the example of FIG. 3, the sum of the difference values D (i, j), which are the values of each of eight elements that are included in a region RC21, becomes the transition cost C (i, j) for the position (i, j) in a case in which one of the frame rows is reproduced with a reproduction speed that is not a normal speed. In this example, the images of two frames of the frame row in the i axis direction are reproduced in a period in which the image of one frames of the frame row in the j axis direction is reproduced. In this case, the length of the two frame rows is different, but since the reproduction speeds of the frame rows are different, a reproduction time of each frame row is the same length.

In addition, the sum of the difference values D (i, j), which are the values of each of six elements that are included in a region RC22, becomes the transition cost C (i, j) for the position (i, j) in a case in which one of the frame rows is reproduced in reverse with respect to the other frame row. In this example, the frame row in the j axis direction is reproduced in order from a frame in which the frame number is largest in a case in which the frame row in the i axis direction is reproduced in order from a frame row in which the frame number is smallest.

Additionally, in a case in which the frame rows of the transition source and the transition destination are determined in a manner that also takes reproduction speed into consideration, for example, in the region RC21 and the region RC22, since the length of the transition period is different, it is necessary to compare the two by normalizing the transition cost C (i, j).

In the abovementioned manner, if the reproduction speed and the reproduction direction are taken into consideration, since it is possible to obtain a more suitable interval as the frame rows of the transition source and the transition destination, it is possible to create a higher quality of looped moving image. In such an instance, by also considering N times speed reproductions where the related art only considered a normal speed reproduction in a forward direction, the present technology is configured to be able to obtain a higher quality of looped moving image.

Additionally, a moving image that is suitable for setting one of the frame rows to be reproduced in reverse with respect to the other frame row is an image in which movements that do not have directionality are included, and for example, are images such as images in which a person changes their expression, images in which an animal changes the orientation of its body, and images in which a flag is flapping in the wind.

In contrast to this, images in which movements that have directionality are included are images in which a person walks from the left off to the right or the like. If this kind of image is set as the raw material, and frame rows in which an interval of a portion of the image is reproduced in reverse are set as the frame rows of the transition source and the transition destination, an obtained looped moving image becomes unnatural.

[Creation of Looped Moving Image that Takes Reproduction Speed into Consideration]

Next, the description of the creation of a looped moving image by the present technology will be continued.

In the present technology, an optimum transition frame image is created while adjusting a speed N when creating a looped moving image.

Firstly, a frame row that is the transition source and a frame row that is the transition destination are determined for the moving image that is the raw material of the looped moving image (hereinafter, also referred to as the raw material moving image). Hereinafter, a frame row that is the transition source is referred to as a transition source frame row FS and a frame row that is the transition destination is referred to as a transition destination frame row FD.

For example, typically, the transition source frame row FS is selected from the vicinity of a terminal end of the raw material moving image, and the transition destination frame row FD is selected from the vicinity of an initial end of the raw material moving image. In addition, a number of frames NF that configures each frame row of the transition source frame row FS and the transition destination frame row FD is supplied in advance as an input parameter.

In a looped moving image that will be created, an image is made to transition using intervals of portions of the transition source frame row FS and the transition destination frame row FD. Further, a minimum number of frames NF_min that is required for transitioning, that is a minimum number of frames of the transition period that is included in the looped moving image is set in advance as an input parameter.

For example, calculating an optimal transition period with a speed N that also includes a reproduction speed of N=1 is the same as calculating an association of partial frame rows that are extracted from within each frame row of the transition source frame row FS and the transition destination frame row FD so that the cost thereof is as small as possible. Additionally, in this instance, the cost is for example, the transition cost C (i, j) that is obtained in the calculation of formula (2).

At this time, if the lengths of frame rows that are extracted from the transition source frame row FS and the transition destination frame row FD are different, it means a transition in which the reproduction speeds will be different.

For example, if 30 transition destination frames are associated with 15 transition source frames, an image transitions while reproducing the frame rows of the transition destination as N=2.

If this problem of association is thought of as a more common problem, it corresponds to performing elastic matching on two signals, a signal X and a signal Y.

That is, a partial sequence is respectively removed from the signal X and the signal Y, a distance between the two sequences is calculated while expanding and contracting each removed sequence, and a sequence combination in which the distance is smallest is searched for.

Dynamic Programming (DP matching) is a method that calculates an optimal correspondence of such a sequence of numbers of differing lengths, and DP matching is used in various fields such as the time sequence pattern recognition of sounds, gestures, and the like, and image pattern recognition.

In order to perform DP matching of a one-dimensional signal X and signal Y, it is necessary to determine matching limitations between the signals.

Figure 4:
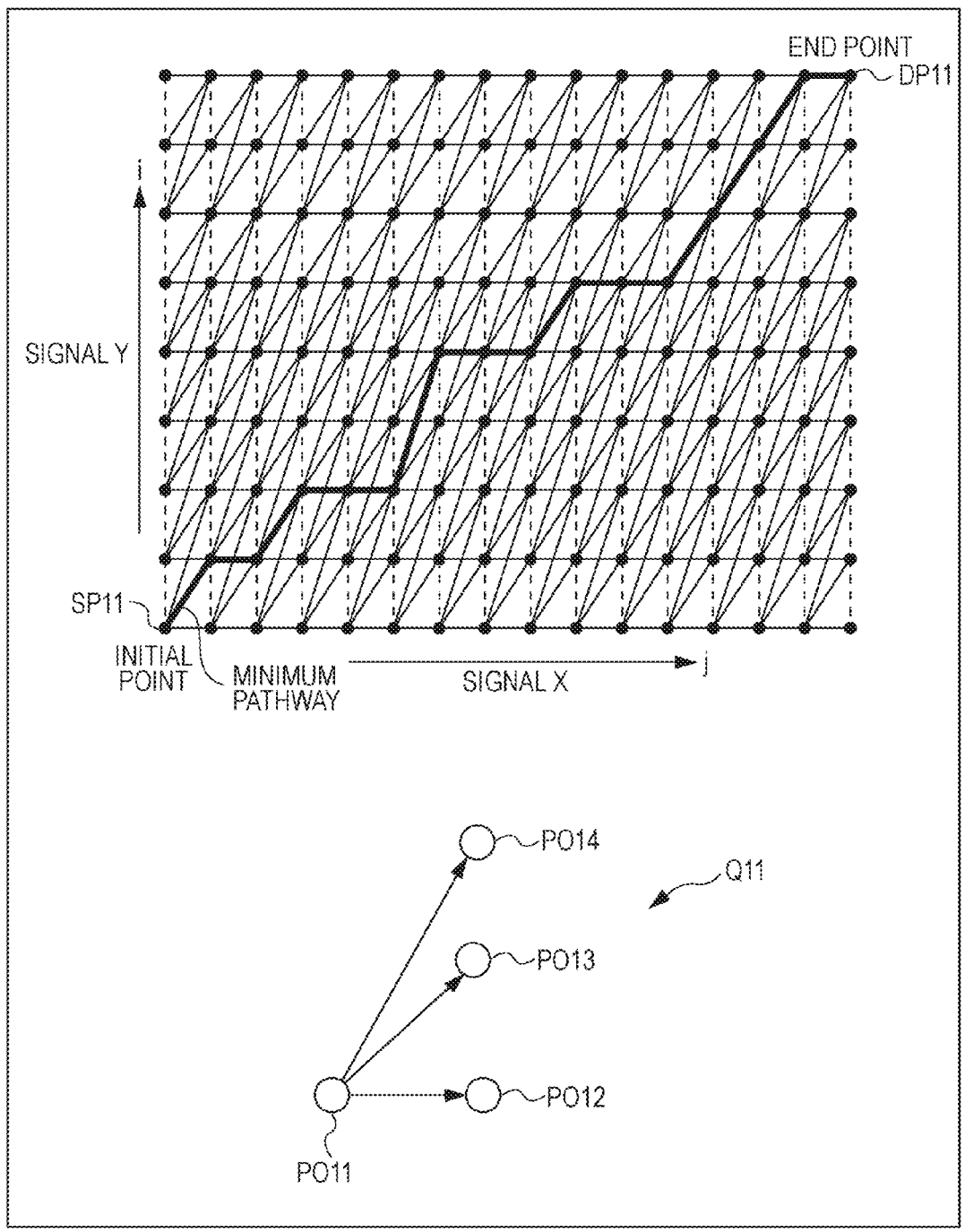
FIG. 4 is a diagram that describes searching for a minimum cost pathway using DP matching.

Generally, a length of the signal X is set as J, a length of the signal Y is set as I, and for example, as shown in FIG. 4, by defining a DP planar surface that has (I×J) lattice points, the connections (edges) between the lattice points are supplied, and a limitation that is called an inclination limitation, is applied to the connections between each lattice point.

Additionally, in FIG. 4, the longitudinal direction and the cross direction respectively indicate time directions of the signal X and the signal Y, and each circle represents a single lattice point on the DP planar surface.

In this instance, if the cross direction in the drawing is set as the j axis direction, and the longitudinal direction is set as the i axis direction, the position of each lattice point on the DP planar surface can be expressed with a position of an ij coordinate system (where, $1 \leq i \leq I$, $1 \leq j \leq J$).

In the DP planar surface of FIG. 4, a position (i, j)=(1, 1) is set as an initial point SP11, a position (i, j)=(I, J) is set as an end point DP11, and when a pathway from the initial point SP11 to the end point DP11 is considered, pathways of the three routes that are indicated by the arrow Q11 are supplied as pathways from each lattice point to another lattice point. That is, the inclination limitations that are shown by the arrow Q11 are supplied.

More specifically, from a lattice point PO11 that is at a position (i, j), it is possible to transition to any one of a lattice point PO12 that is at a position (i, j+1), a lattice point PO13 that is at a position (i+1, j+1), or a lattice point PO14 that is at a position (i+2, j+1). In other words, the lattice point PO11 connected to a pathway of any one of the lattice points from lattice point PO12 to lattice point PO14.

Furthermore, in the DP planar surface, a cost is defined for each lattice point and the edges between lattice points, or for both each lattice point and the edges between lattice points.

Further, the costs along pathways from the initial point SP11 to the end point DP11 of the DP planar surface are integrated, a pathway in which the cost is the smallest is calculated using DP matching, and a group of each lattice point that the pathway that is obtained as a result passes through becomes a way to combine of an optimal signal.

It is possible for this kind of DP matching to be applied to the abovementioned association of the transition source frame row FS and the transition destination frame row FD.

In such a case, a combination in which a distance between the transition source frame row FS and the transition destination frame row FD is the smallest is obtained in the following manner. That is, a combination of two frame rows that are removed from the transition source frame row FS and the transition destination frame row FD is made while changing the length of the removed frame rows, elastic matching of each set of frame rows is performed, and it is sufficient if a set in which a distance from each set is the smallest is selected.

However, if such a process is performed, the number of combinations of two frame rows that are removed from the transition source frame row FS and the transition destination frame row FD becomes an enormous number. In such a case, by using an extended function of DP matching such as that below, it is possible to reduce the number of combinations of frame rows.

That is, DP matching that uses an extended function is DP matching with initial point and end point freedom, and is DP matching in which a plurality of candidates for the initial point and the end point are supplied in contrast to DP matching in which the initial point SP11 and the end point DP11 are fixed in the example of FIG. 4.

Figure 5:
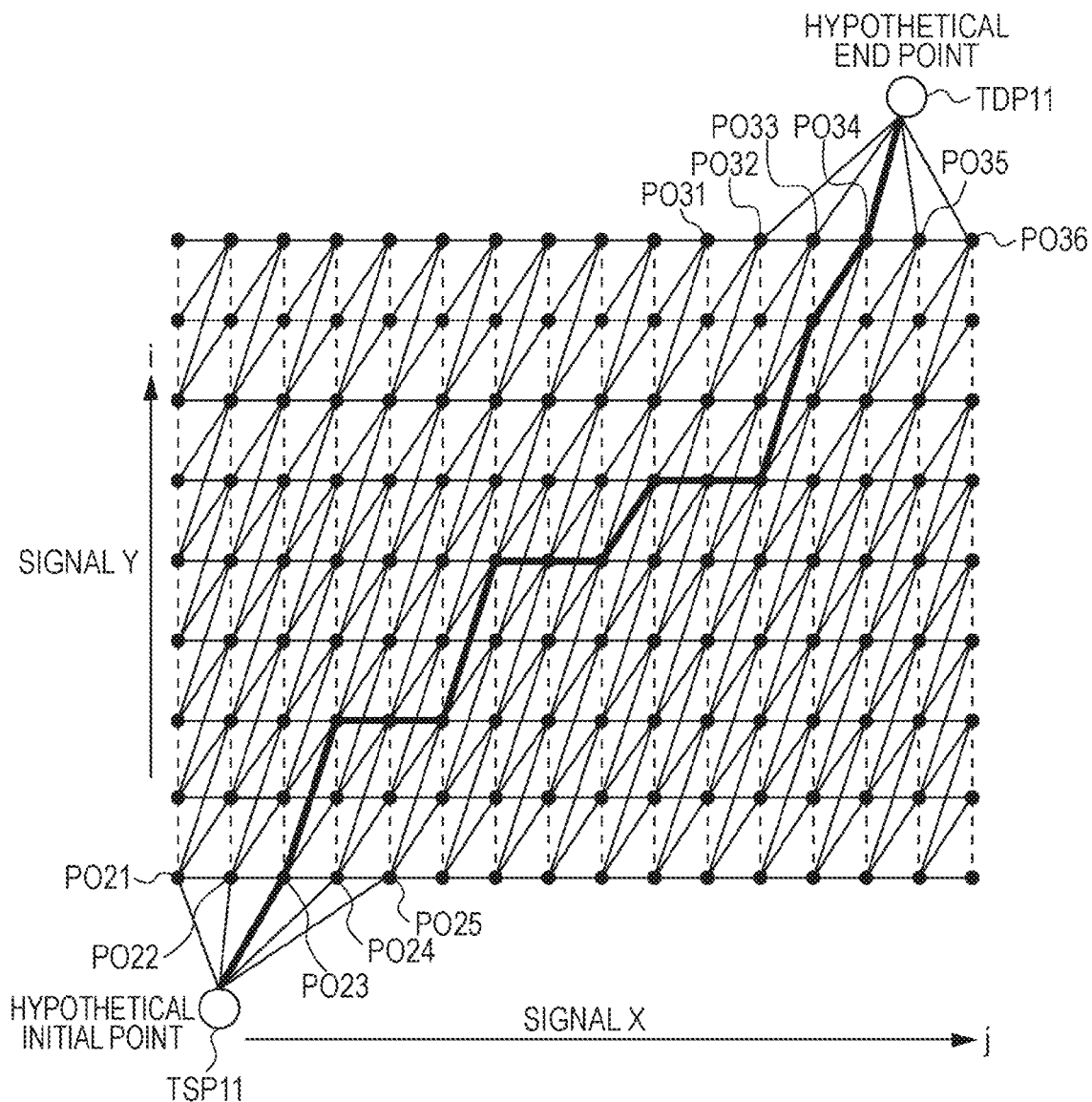
FIG. 5 is a diagram that describes searching for a minimum cost pathway using DP matching.

More specifically, as shown in FIG. 5, the DP planar surface is expanded. Additionally, in FIG. 5, the longitudinal direction and the cross direction respectively indicate the i axis direction and the j axis direction, and each circle represents a single lattice point on the DP planar surface.

In FIG. 5, in contrast to the DP planar surface that is indicated in FIG. 4, a hypothetical initial point TSP11 and a hypothetical end point TDP11 are further supplied.

Further, in the DP planar surface, five lattice points from lattice point PO21 to lattice point PO25 are set as genuine initial point candidates with respect to the hypothetical initial point TSP11, respective edges from the hypothetical initial point TSP11 to the lattice points from lattice point PO21 to lattice point PO25 are defined, and the cost of the edges is set as 0.

In addition, six lattice points from lattice point PO31 to lattice point PO36 are set as genuine end point candidates with respect to the hypothetical end point TDP11, respective edges from the hypothetical end point TDP11 to the lattice points from lattice point PO31 to lattice point PO36 are defined, and the cost of the edges is set as 0.

As a result of this, by merely applying DP matching to the DP planar surface, a pathway from the genuine initial points to end points is determined automatically as a pathway in which the total cost is the smallest.

Due to this kind of DP matching with initial point and end point freedom, with respect to the signal X, among partial signals of the signal X, a partial signal in which the cost is the smallest is selected.

That is, in the elastic matching of a signal X with variable length and a signal Y with variable length, since it is possible to fix the input of the signal X, it is possible to greatly reduce the number of combinations to be tried. In addition, elastic matching of the signal Y is performed with the signal X by extracting all partial signal patterns while changing the partial signal length and the partial signal initiation position.

In other words, in the DP planar surface that is indicated in FIG. 5, since the hypothetical initial points and end points are determined, if a fixed signal X is input, matching is performed for each partial signal that is extracted from the signal X using DP matching. Therefore, if DP matching is performed on the partial signals and the signal X as the input thereof while changing the signal length of partial signals that are extracted from the signal Y, an elastic matching processing result of the variable length signal X and the variable length signal Y is obtained.

Next, a specific method for creating a looped moving image using the abovementioned DP matching will be described. Additionally, in a case in which a looped moving image is created, the transition source frame row FS and the transition destination frame row FD may both be set to have variable lengths, but in this instance, an example in which the transition source frame row FS has a fixed length and only transition destination frame row FD has a variable length will be described. In such a case, it is possible to reduce the amount of calculations in comparison with a case in which both of the frame rows are set to have variable lengths.

For example, a transition source frame row FS and a transition destination frame row FD in which the number of frames is NF is supplied, and optimal matching of partial frame rows that are included in these frame rows is calculated.

In this case, the transition source frame row FS is set to have a fixed length, and the partial frame rows thereof are selected with initial point and end point freedom.

In addition, with regard to the transition destination frame row FD, partial frame rows are determined by changing the initiation position of partial frame rows between a $1^{st}$ frame and an $(NF-NF\_min)^{th}$ frame of the transition destination frame row FD, and changing the length of the partial frame rows between lengths from the NF_min to the NF. Additionally, hereinafter, there are cases in which the frame rows that are extracted from the transition destination frame row FD and used in DP matching are referred to as partial frame rows FD'.

In the present technology, for example, a DP planar surface is created from the transition source frame row FS and the transition destination frame row FD in the same manner as that in FIG. 5. At this time, a portion of the genuine initial points and end points become the partial frame rows FD'.

In this instance, in the DP planar surface, the direction of the transition source frame row FS is the i axis direction and the direction of the partial frame rows FD' (the transition destination frame row FD) is the j axis direction. Further, in the ij coordinate system, the i coordinate of a position of a $K^{th}$ frame of the transition source frame row FS is set as i=K, and the j coordinate of a position of an $L^{th}$ frame of the transition destination frame row FD, which is set as the frame of the partial frame rows FD', is set as j=L.

In addition, a lattice point is disposed in each position (i, j) of the DP planar surface, and hypothetical initial points and end points are supplied to the DP planar surface. Further, lattice points that are in the position (i, j)=(1, 1) to (1, NF−NF_min) are connected to the hypothetical initial points, and hypothetical end points are connected to each lattice point at which the i coordinate is the maximum and the j coordinate is between NF_min and the maximum value thereof.

Figure 6:
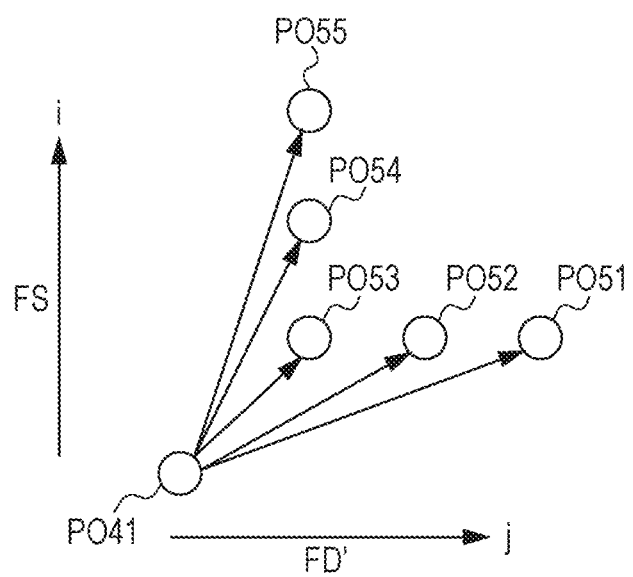
FIG. 6 is a diagram that describes an inclination limit of an edge in a DP planar surface.

Furthermore, connections (edges) are supplied between the lattice points, and for example, an inclination limitation such as that indicated in FIG. 6 is supplied to the connections between each lattice point.

Additionally, in FIG. 6, the longitudinal direction and the cross direction respectively indicate the i axis direction (the direction of the transition source frame row FS) and the j axis direction (the direction of the partial frame row FD'), and each circle represents a single lattice point.

In the example of FIG. 6, it is possible to take a pathway to any one of the lattice points from lattice point PO51 to lattice point PO55 from the lattice point PO41.

For example, if the lattice point PO41 is set to be in a position (i, j), the position of the lattice point PO51 becomes a position (i+1, j+3). In other words, a pathway to the lattice point PO51 from the lattice point PO41 becomes an association of proceeding by 3 in a partial frame row FD' direction while proceeding by 1 in a transition source frame row FS direction.

If the reproduction speed of the transition source frame row FS is set as a normal speed, this association corresponds to the reproduction speed of the partial frame row FD' becoming three times speed. In other words, the association corresponds to the relative reproduction speed of the partial frame row FD' becoming three times that of the transition source frame row FS.

Therefore, in a case in which a pathway proceeds to the lattice point PO51 from the lattice point PO41, the position (i, j) of the lattice point PO41 and the position (i+1, j+3) of the lattice point PO51 can be said to have the following relationship.

That is, frame i and frame j are set as points of origin (reproduction initiation positions), the reproduction speed of the partial frame row FD' is set as three times that of the transition source frame row FS, and the transition source frame row FS and partial frame row FD' are set to be hypothetically reproduced. At this time, among frame pairs of the transition source frame row FS and the partial frame row FD' in which the frame i and the frame j differ, a frame pair that comes after the frame i and the frame j, which are the reproduction initiation positions, and should be the first frame pair to be presented at the same time is frame i+1 and frame j+3.

The position of the lattice point PO52 with respect to the position (i, j) of the lattice point PO41 becomes a position (i+1, j+2), and at this time the relative reproduction speed of the partial frame row FD' with respect to the transition source frame row FS becomes a two times speed.

In addition, the position of the lattice point PO53 with respect to the position (i, j) of the lattice point PO41 becomes a position (i+1, j+1), and at this time the relative reproduction speed of the partial frame row FD' with respect to the transition source frame row FS becomes a normal speed.

The position of the lattice point PO54 with respect to the position (i, j) of the lattice point PO41 becomes a position (i+2, j+1), and at this time the relative reproduction speed of the partial frame row FD' with respect to the transition source frame row FS becomes one half speed.

Furthermore, the position of the lattice point PO55 with respect to the position (i, j) of the lattice point PO41 becomes a position (i+3, j+1), and at this time the relative reproduction speed of the partial frame row FD' with respect to the transition source frame row FS becomes one third speed.

Additionally, the reproduction speed that is described in this instance is for describing a positional relationship between two lattice points, and differs from a reproduction speed that is established by a difference in the overall length of the transition source frame row FS and the partial frame row FD'. The reproduction speed that is established by a difference in the overall length of the frame rows is a relative reproduction speed of the transition source frame row FS and the partial frame row FD' that is necessary in order to make reproduction times uniform when setting so that a transition from the transition source to the transition destination is performed.

In addition, in the DP planar surface, a cost is defined for the edge between each lattice point.

For example, in a case in which each lattice point of the DP planar surface is supplied with the inclination limitation that is indicated in FIG. 6, it is necessary to normalize the cost of each pathway on the DP planar surface from the hypothetical initial points to a predetermined lattice point. This because, even if pathways arrive at the same lattice point, the number of times that a cost is added will differ if the pathways differ.

For example, in this instance, supposing that a cost at a lattice point that is in position (i, j) is set as a value of a difference value D (i, j) that is obtained by formula (1) that is mentioned above, in a practical sense, a configuration in which a different cost is allocated to each edge that reaches the lattice point as a cost to be added to the edge, is used. That is, a cost to be added to the edge is for example, scaled to correspond to the length of the edge, or in other words, an edge length. Additionally, the cost at a lattice point is a cost that is supplied temporarily in order to supply costs to the edges, and costs are not supplied to lattice points in a final DP planar surface.

More specifically, a cost at a lattice point that is at the position (i, j) is set a value of the difference value D (i, j), and an edge length of an edge k that is connected to the lattice point is set as a length(k). In this case, as shown in formula (3) below, a value that is obtained by multiplying the difference value D (i, j) by the length(k) is set as a cost E (i, j, k) to be added to the edge k.

[Equation 3]

$$E(i,j,k) = D(i,j) \times \text{length}(k) \quad (3)$$

Figure 7:
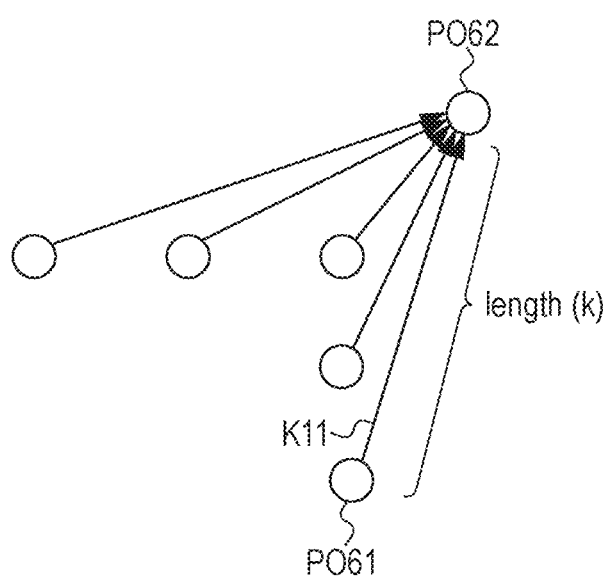
FIG. 7 is a diagram that describes the calculation of a cost that takes an edge length into consideration.

For example, as shown in FIG. 7, in the DP planar surface, the length of an edge k11 from the lattice point OP61 to the lattice point PO62 is set as the length(k). In addition, the position of the lattice point OP62 is set as the position (i, j).

In this case, the cost E (i, j, k) to be added to the edge k11 becomes the product "D (i, j)×length(k)" of the difference value D (i, j) that is calculated for the position (i, j) and the length of the edge k11 length(k).

In this instance, the difference value D (i, j) is a difference value that is obtained by calculating the abovementioned formula (1). That is, the difference value D (i, j) is the sum total of the square values of the differences between a pixel value of each pixel of an image of an $i^{th}$ frame from the leading frame of the transition source frame row FS, and a pixel value of each pixel of an image of a $j^{th}$ frame from the leading frame of the transition destination frame row FD that is set as the frame of the partial frame row FD'.

The difference value D (i, j) indicates a level of similarity between the image of the transition source frame row FS and the image of the partial frame row FD', but in a case in which the cost E (i, j, k) is determined, it is possible to use an optical flow or the like in place of the difference value D (i, j).

According to such a configuration, a cost E (i, j, k) is added to the edges between each lattice point on the DP planar surface. At this time, since a total cost of a pathway from an initial point to an end point of the DP planar surface is a total value of the costs that are added to the edges along the pathway, the number of times that a cost is added during the calculation of the total cost of a pathway is further reduced the more long edges are selected in a pathway.

In such an instance, by setting the cost of the edges through multiplication of the length of the edges by the difference value, it is possible to increase the cost of the edges by an amount by which the number of times that a cost is added is reduced, and a pathway in which the total cost is the smallest is calculated accurately.

Additionally, hereinafter, there are cases in which a pathway that is obtained through DP matching of the transition source frame row FS and the partial frame row FD', and in which the total cost from an initial point to an end point of the DP planar surface, is the smallest is also referred to as the minimum cost pathway, and the total cost of the minimum cost pathway is referred to as the minimum total cost.

If DP matching of the transition source frame row FS and the transition destination frame row FD is performed by determining hypothetical initial points and end points, DP matching of the transition source frame row FS and each partial frame row FD' is performed.

If DP matching of the transition source frame row FS and the partial frame row FD' is performed, since the minimum total cost is obtained for each partial frame row FD' of the transition destination frame row FD, among the partial frame rows FD', it is sufficient to select the partial frame row FD' in which the minimum total cost is the smallest.

However, the signal length, or in other words, the number of frames differs in each partial frame row FD', and since the number of times that a cost is added during the calculation of the minimum total cost differs for each partial frame row FD', it is not possible to compare each minimum total cost in an equitable manner without change.

In such a case, a partial frame row FD' in which a normalized minimum total cost is smallest may be selected after normalization of the minimum total cost by dividing the minimum total cost that is calculated for the partial frame row FD' by the signal length, or in other words, the number of frames of the partial frame row FD'.

Therefore, in a case in which the signal length of the partial frame row FD' is m, and the initiation position of the partial frame row FD' on the DP planar surface is the position (i, j), a total cost C (i, j, m) of a minimum cost pathway of the partial frame row FD' is calculated by calculating the following formula (4).

[Equation 4]

$$C(i, j, m) = \frac{1}{m} \sum_{\substack{x=i, y=j \\ (x,y) \in min\_path(i,j,m)}}^{y=j+m} E(x, y, k) \quad (4)$$

Additionally, in formula (4), E (x, y, k) indicates the cost of edges that is obtained using formula (3). Therefore, the total cost C (i, j, m) is obtained by dividing the sum total of the cost E (x, y, k) of each edge on the minimum cost pathway by a signal length m of the partial frame row FD'.

Among each partial frame row FD', the partial frame row FD' in which the total cost C (i, j, m) that is calculated by formula (4) is smallest, is set as a final transition destination frame row FD.

In the abovementioned manner, if DP matching is performed, a transition source frame row FS that is the final transition source and a transition destination frame row FD, or in other words, a selected partial frame row FD' that is the final transition destination are obtained.

Next, a description of the manner in which the transition source frame row FS and the transition destination frame row FD that are obtained by DP matching are blended and reproduced will be given.

For example, in a case in which the reproduction speed of the transition source is fixed at 1 by the association of the transition source frame row FS and the transition destination frame row FD, the reproduction speed of the transition destination becomes various speeds.

Therefore, if the transition destination frame row FD is set as the reproduction speed of the transition source frame row FS, and an image that is obtained by blending the images of each frame of the frame rows is reproduced, the connections of the image when completely transitioning to the transition destination are poor. This is due to the generation of a location in which the reproduction speed of the transition destination rapidly changes from a N times speed to a normal speed.

In such an instance, in the present technology, the transition source is set to a reproduction speed of 1 and the transition destination is set to a reproduction speed of N at a transition initiation time point, or in other words, at the leading frame of the transition period, and each frame of the transition period is created by gradually changing the reproduction speeds so that the transition source becomes a reproduction speed of 1/N and the transition destination becomes a reproduction speed of 1 at a transition ending time point, or in other words, at the ending frame of the transition period.

In the present technology, a process that allocates reproduction speeds in this manner is performed.

That is, a row of a frame that corresponds to both the transition destination frame row FD and the transition source frame row FS that are obtained by DP matching, or in other words, a similar frame (hereinafter, also referred to as a matching frame), is obtained from the minimum cost pathway during DP matching.

In addition to being a frame of a lattice point position on the minimum cost pathway, a matching frame is obtained by determining frames, among each frame of the transition destination frame row FD and the transition source frame row FS, that correspond to other frame rows of frames that were not set as matching frames.

Figure 8:
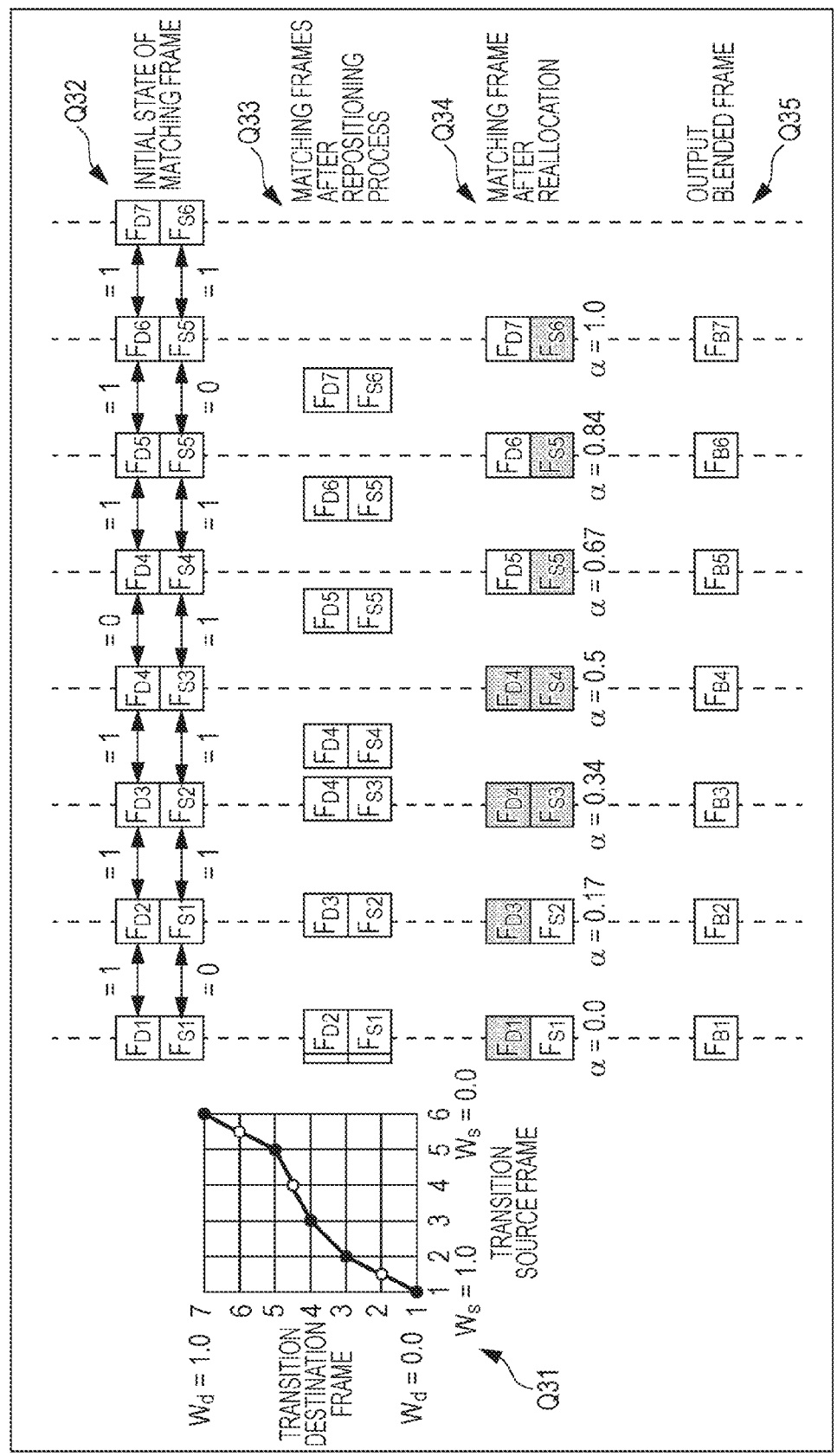
FIG. 8 is a diagram that describes a blending process.

More specifically, for example, a DP matching result that is indicated by the arrow Q31 of FIG. 8 is obtained. In this example, a horizontal axis in the drawing indicates a frame number i of the transition source frame row FS (where, $1 \leq i \leq 6$), and a vertical axis indicates a frame number j of the transition destination frame row FD (where, $1 \leq j \leq 7$). In addition, each circle represents a matching frame row of the transition source frame row FS and the transition destination frame row FD.

For example, matching frames in each position in which the position (i, j)=(1, 1), (2, 3), (3, 4), (5, 5) and (6, 7) are configured as a set of frames of the transition source frame row FS and the transition destination frame row FD that is indicated by lattice points along the minimum cost pathway that is obtained by DP matching. For example, the position (i, j)=(1, 1) indicates a matching frame in which the $1^{st}$ frame of the transition source frame row FS and the $1^{st}$ frame of the transition destination frame row FD mutually corresponds to one another.

However, a frame of the transition destination frame row FD that corresponds to the $4^{th}$ frame of the transition source frame row FS, and frames of the transition source frame row FS that correspond to the $2^{nd}$ and $6^{th}$ frames of the transition destination frame row FD are not established as it is.

In such an instance, for example, matching frames that correspond to the $4^{th}$ frame of the transition source frame row FS, and the $2^{nd}$ frame and $6^{th}$ frame of the transition destination frame row FD are determined on the basis of each position (i, j) that corresponds to the lattice points on the minimum cost pathway.

As a result of this, for example, frame pairs that indicate each position in which the position (i, j)=(1, 2), (4, 4) and (5, 6) are set as matching frames.

That is, a frame that corresponds to the $2^{nd}$ frame of the transition destination frame row FD is set as the $1^{st}$ frame of the transition source frame row FS, and a frame that corresponds to the $4^{th}$ frame of the transition source frame row FS is set as the $4^{th}$ frame of the transition destination frame row FD. In addition, and a frame that corresponds to the $6^{th}$ frame of the transition destination frame row FD is set as the $5^{th}$ frame of the transition source frame row FS.

If the matching frame rows of the transition source frame row FS and the transition destination frame row FD are established in this manner, next, as shown by the arrow Q32 on the right-hand side of FIG. 8, in an initial state, the matching frames are allocated so that reproduction is performed at a speed of 1 without being changed.

Additionally, in FIG. 8, the right direction on the right-hand side indicates a time direction, and each rectangle represents an image of a single frame.

In particular, frames in which $F_{Si}$ (where, $1 \leq i \leq 6$) is written inside the rectangle represent an $i^{th}$ frame from the leading frame of the transition source frame row FS, frames in which $F_{Dj}$ (where, $1 \leq j \leq 7$) is written inside the rectangle represent a $j^{th}$ frame from the leading frame of the transition destination frame row FD. In addition, frames in which $F_{Bh}$ (where, $1 \leq h \leq 7$) is written inside the rectangle represent an $h^{th}$ frame, which is obtained by blending the transition source frame row FS and the transition destination frame row FD, from the leading frame of a transition period.

Additionally, hereinafter, the $i^{th}$ frame of the transition source frame row FS is referred to as a frame $F_{Si}$, and the $j^{th}$ frame of the transition destination frame row FD is referred to as a frame $F_{Dj}$. In addition, hereinafter, the $h^{th}$ frame of a transition period is referred to as a frame $F_{Bh}$.

In FIG. 8, in a portion that is indicated by the arrow Q32, each matching frame is lined up at regular intervals.

That is, a pair of the frame $F_{S1}$ and the frame $F_{D1}$, a pair of the frame $F_{S1}$ and the frame $F_{D2}$, a pair of the frame $F_{S2}$ and the frame $F_{D3}$ and a pair of the frame $F_{S3}$ and the frame $F_{D4}$ are lined up in order in a right direction.

Further, a pair of the frame $F_{S4}$ and the frame $F_{D4}$, a pair of the frame $F_{S5}$ and the frame $F_{D5}$, a pair of the frame $F_{S5}$ and the frame $F_{D6}$ and a pair of the frame $F_{S6}$ and the frame $F_{D7}$ are lined up in order in a right direction to the right of the above-mentioned pairs.

Each frame $F_{Si}$ that configures the pairs of the frames $F_{Si}$ of the transition source frame row FS and the frames $F_{Dj}$ of the transition destination frame row FD that are lined up in time sequence is lined up in order of increasing or decreasing frame number, or in other words, in either ascending or descending order. In the same manner, each frame $F_{Dj}$ that configures the pairs of the frames $F_{Si}$ and the frames $F_{Dj}$ is also lined up in either ascending or descending order.

In addition, in the portion that is indicated by the arrow Q32, a numerical value that indicates a time lag between the frames is indicated between each frame $F_{Si}$ that is lined up in the right direction. Additionally, the unit of the time lag is the number of frames.

For example, between points at which the same frame $F_{S1}$ is lined up, a time lag of "0" between the frames $F_{S1}$ is indicated, and between points at which the frame $F_{S1}$ and the frame $F_{S2}$ are lined up, a time lag of "1" between the frames is indicated.

In the same manner, a numerical value that indicates a time lag between the frames is indicated between each frame $F_{Dj}$ that is lined up in the right direction. For example, between points at which the same frame $F_{D4}$ is lined up, a time lag of "0" between the frames $F_{D4}$ is indicated, and between points at which the frame $F_{D1}$ and the frame $F_{D2}$ are lined up, a time lag of "1" between the frames is indicated.

If the matching frames are lined up at regular intervals in this manner, a matching frame repositioning process is performed from this state (the initial state), and each pair of frame $F_{Si}$ and frame $F_{Dj}$ is repositioned.

In the matching frame repositioning process, the positions of pairs of the frames $F_{Si}$ and the frames $F_{Dj}$ that are lined up in time sequence are displaced from an initial end to a terminal end of the transition period, that is, moving toward the tail end thereof from the leading frames of the pairs, so that a time lag (a gap) between frames of the transition source and the transition destination gradually becomes 1.

That is, a layout position of each frame pair is adjusted so that a gap between each frame $F_{Si}$ of the transition source frame row FS becomes 1 in the vicinity of the initiation position of the transition period that is on the left-hand side in FIG. 8, and a gap between each frame $F_{Dj}$ of the transition destination frame row FD becomes 1 in the vicinity of a terminal position of the transition period that is on the right-hand side in FIG. 8.

In a case in which each pair of the frames $F_{Si}$ and the frames $F_{Dj}$ is positioned in a time direction, intervals in which the same frames are continuously lined up in the right direction in the drawing are locations in which reproduction would originally be performed with a time lag of 0.

However, in the state that is indicated by the arrow Q32, even in a case in which the time lag between frames $F_{Si}$ that are lined up in the horizontal direction, is 0, there are location in which the time lag between frames $F_{Dj}$ that are in the same position, is not 0. For example, in a portion in which the pair of the frame $F_{S1}$ and the frame $F_{D1}$ is lined up with the pair of the frame $F_{S1}$ and the frame $F_{D2}$, the time lag of the frames $F_{S1}$ is 0, but the time lag of the frame $F_{D1}$ and the frame $F_{D2}$ is 1.

In such an instance, in the matching frame repositioning process, in places where the time lag differs between the transition destination and the transition source, the gap (time lag) between the layout position of each frame is adjusted with weightings. As a result of this, the transition source frame row FS is positioned with a gap that is close to a reproduction speed of 1 time at the initial end of transition and the transition destination frame row FD is positioned with a gap that is close to a reproduction speed of 1 at the terminal end of transition.

For example, in the matching frame repositioning process, a weighting is attached to a frame gap of frames of the transition destination and the transition source that are positioned so as to be mutually adjacent to one another, or in other words, the time lag that is indicated by the arrow Q32. Further, by blending the weighted frame gap (time lag), an updated frame gap is calculated. Further, for each frame pair, the frame pairs are relocated so that each frame pair is lined up with an obtained frame gap (time lag) with respect to a frame pair that is immediately prior to the frame pair in the time direction.

More specifically, a weighting WS is supplied to the transition source frame row FS, and a weighting WD is supplied to the transition destination frame row FD.

Additionally, to explain in more detail, the weighting WS is formed from weightings $WS_i$ (where, $1 \leq i \leq 6$) that are supplied with respect to each frame $F_{Si}$ of the transition source frame row FS, and the weighting WD is formed from weightings $WD_j$ (where, $1 \leq j \leq 7$) that are supplied with respect to the each frame $F_{Dj}$ of the transition destination frame row FD.

In this instance, the weighting WS is established so as to decrease toward an ending position from a leading position of the transition source frame row FS. In other words, for example, a weighting $WS_1$ is set as 1.0, a weighting $WS_6$ is set as 0.0, and weightings $WS_i$ between the two are set to values that are calculated with linear interpolation using the weighting $WS_1$ and the weighting $WS_6$.

On the other hand, the weighting WD is established so as to increase toward an ending position from a leading position of the transition destination frame row FD. In other words, for example, a weighting $WD_1$ is set as 0.0, a weighting $WD_7$ is set as 1.0, and weightings $WD_j$ between the two are set to values that are calculated with linear interpolation using the weighting $WD_1$ and the weighting $WD_7$.

This kind of weighting WS is used, and the weighting between the frames of the transition source frame row FS is calculated. The weighting between the frames is for example, set as an average value of the weighting of mutually adjacent frames. Therefore, for example, a weighting between the frame $F_{S1}$ and the frame $F_{S2}$ is set as $(WS_1+WS_2)/2$. In the same manner as the weighting between the frames of the transition source frame row FS, the weighting between the transition destination frame row FD is calculated by using the weighting WD.

Further, a used weighting is used, a blending process is carried out on the frame gap (time lag) of the transition source frame row FS and the frame gap (time lag) of the transition destination frame row FD, and an updated frame gap (time lag) is calculated for a target frame pair.

For example, focusing on the frame pair of the frame $F_{S1}$ and the frame $F_{D2}$ is a target, the frame pair that is immediately prior to this frame pair is the pair of the frame $F_{S1}$ and the frame $F_{D1}$.

Therefore, the same frame $F_{S1}$ is lined up for the transition source frame row FS of these pairs, and the frame $F_{D1}$ and the frame $F_{D2}$ are lined up for the transition destination frame row FD thereof.

In such an instance, as a weighting that is used in the blending process of the frame gaps, an average value of the weighting $WD_1$ of the frame $F_{D1}$ and the weighting WD2 of the frame $F_{D2}$ is calculated as a weighting (set as $WD_1$ or $_2$) between the frames. Additionally, since the same frame $F_{S1}$ is lined up for the transition source frame row FS, the weighting $WS_1$ is used without being changed. The reason for this is that the average value of two weightings $WS_1$ is the weighting $WS_1$.

Further, blending of the frame gap of a frame pair that is immediately prior to the target pair of the frame $F_{S1}$ and the frame $F_{D2}$, is performed.

In this case, since the same frame $F_{S1}$ is lined up for the transition source frame row FS, the frame gap (time lag) thereof is "0". In addition, since the frame $F_{D1}$ and the frame $F_{D2}$ are lined up for the transition destination frame row FD, the frame gap (time lag) thereof is "1".

Therefore, if blending (weighted addition) of these frame gaps is performed by adding the calculated weightings, a desired frame gap is finally obtained. That is, $(WS_1 \times 0) + (WD_{1,2} \times 1)$ is calculated, and an obtained value is the final frame gap.

When the final frame gap (time lag) is obtained, the pair of the frame $F_{S1}$ and the frame $F_{D2}$ is relocated so that a frame gap between the target pair of the frame $F_{S1}$ and the frame $F_{D2}$ and the pair of the frame $F_{S1}$ and the frame $F_{D1}$ that is immediately prior thereto, or in other words, the gap that is lined up in the horizontal direction in the drawing, becomes the calculated frame gap.

The matching frame repositioning process is performed in this manner, and when each frame pair that is indicated by the arrow Q32 is repositioned, the layout that is indicated by the arrow Q33 is obtained. In this example, the pair of the frame $F_{S1}$ and the frame $F_{D2}$ is positioned in a position that substantially overlaps with the pair of the frame $F_{S1}$ and the frame $F_{D1}$ that is immediately prior thereto.

If the matching frame repositioning process is performed, and each frame pair is repositioned, matching frames of each time instant of the transition period that is reproduced in a practical sense, are selected.

Each frame pair that is indicated by the arrow Q33 is positioned so that the position of a leading frame pair of the frame pairs that are lined up in time sequence is a position of a time instant of the leading frame of the transition period.

In this instance, for example, as shown by the arrow Q34, among each frame pair, for each presentation time instant of each frame of the transition period that is indicated with a dotted line, a frame pair that is positioned in a position that is closest to the time instant, is selected. In this case, there are also frame pairs that are discarded without being selected.

In the example that is indicated by the arrow Q34, the pair of the frame $F_{S1}$ and the frame $F_{D1}$, the pair of the frame $F_{S2}$ and the frame $F_{D3}$, the pair of the frame $F_{S3}$ and the frame $F_{D4}$, the pair of the frame $F_{S4}$ and the frame $F_{D4}$, the pair of the frame $F_{S5}$ and the frame $F_{D5}$, the pair of the frame $F_{S5}$ and the frame $F_{D6}$ and the pair of the frame $F_{S6}$ and the frame $F_{D7}$ are selected as pairs of matching frames of each time instant of the transition period.

Ultimately, the image of each frame of frame pairs that are selected for each time instant of the transition period are blended using a blending rate $\alpha$, and are set as the images of the frames of the transition period. Additionally, in FIG. 8, the blending rate $\alpha$ at each time instant of the transition period is indicated at the position of the dotted line that represents the time instant of the transition period.

In this example, the blending rate $\alpha$ indicates a weighting that is multiplied by each frame $F_{Dj}$ of the transition destination frame row FD, and the blending rate $\alpha$ increases in a linear manner, from $\alpha=0.0$ to $\alpha=1.0$, as the frame number of the transition period increases.

In addition, during the blending of frame pairs, $(1-\alpha)$ is multiplied by each frame $F_{Si}$ of the transition source frame row FS as a weighting.

Therefore, for example, focusing on a first frame FB1 of the transition period, if the image of the frame $F_{S1}$ of the transition source frame row FS is set as $F_{S1}$, and the image of the frame $F_{D1}$ of the transition destination frame row FD is set as $F_{D1}$, the image of the frame FB1 is calculated by $\alpha \times F_{D1} (1-\alpha) \times F_{S1}$.

As a result of this kind of blending of each frame of the transition source frame row FS and the transition destination frame row FD, the image of each frame of the transition period is created. In FIG. 8, the images (frame rows) of the transition period are images that gradually begin to transition from the images of the transition source frame row FS to the images of the transition destination frame row FD.

When the frame rows of the transition period are obtained, a looped moving image that is formed from frame rows of an interval between an ending frame (an out point) of the transition destination frame row FD and a starting frame (an in point) of the transition source frame row FS of the raw material moving image, and frame rows of the transition period that follow the frame row is obtained.

Additionally, looped moving images that include reverse reproduction can also be created using the same calculation as the method that is described above.

In such a case, in the abovementioned DP matching, combinations that also take reverse reproduction into consideration may be added as combination of the transition source frame row FS and the partial frame row FD' that is extracted from the transition destination frame row FD.

For example, a minimum number of frames of the transition period that is included in the looped moving image is set as NF_min, and the number of frames that configures each frame row of the transition source frame row FS and the transition destination frame row FD is set as NF.

In this case, partial frame rows FD' are extracted by changing a leading frame (an initiation position) of the partial frame row FD' that is extracted from the transition destination frame row FD from a leading frame to a frame between an $NF^{th}$ and an $(NF- NF\_min)^{th}$ frame of the transition destination frame row FD, and changing the length of the signal of the partial frame rows FD' between the NF_min and the NF. At this time, frame rows that are obtained by lining up a display order (the order of the frames) of the frame rows that are extracted from the transition destination frame row FD in reverse, or in other words, frame rows that are obtained by lining up each frame in order from new frame numbers to old frame numbers, are set as partial frame rows FD'.

Further, DP matching is performed on each combination of the transition source frame rows FS and the obtained partial frames row FD', and a reversely reproduced final transition destination frame row FD is obtained. Therefore, a reversely reproduced frame row of the transition period is obtained from the reversely reproduced transition source frame row FS and the transition destination frame row FD.

However, in a case in which a looped moving image that uses reverse reproduction is finally output, since two transition periods are necessary, it is necessary to respectively create a forward reproduction transition period and a reverse reproduction transition period independently of each other from the raw material moving image.

Figure 9:
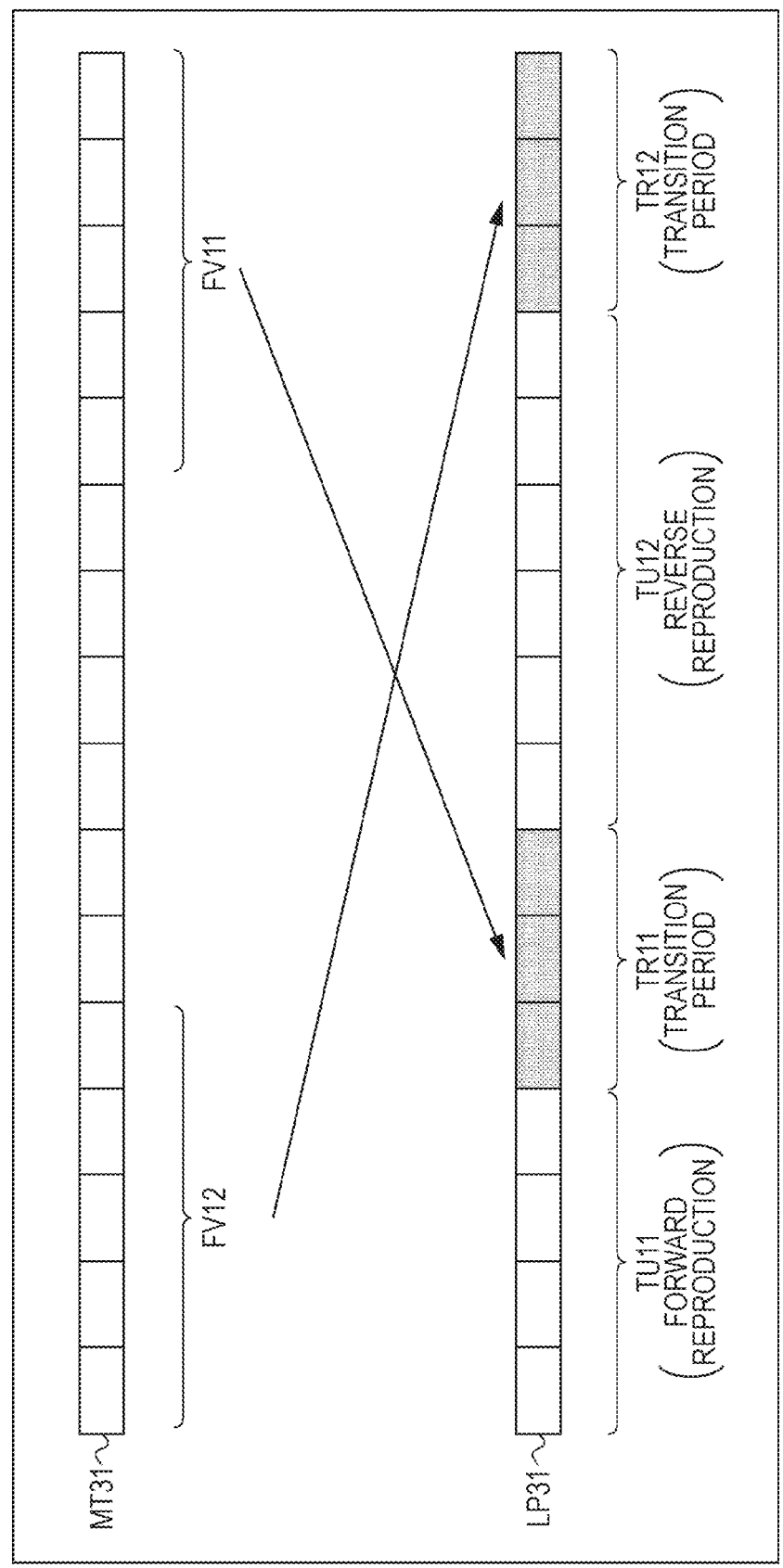
FIG. 9 is a diagram that describes the creation of a looped moving image that includes reverse reproduction.

For example, as shown in FIG. 9, a configuration that creates a looped moving image LP31 that includes reverse reproduction intervals from a raw material moving image MT31, is used.

In this case, a transition source frame row $F_{S1}$ and a transition destination frame row $F_{D1}$ for obtaining a forward reproduction transition period TR11, or in other words, a transition period TR11 in which image transitioning is performed using reproduction in a forward direction, from an interval FV11 that is in the vicinity of a terminal end of the raw material moving image MT31 using DP matching, are established.

Further, the images of each frame of the transition source frame row $F_{S1}$ and the transition destination frame row $F_{D1}$ are blended, and the transition period TR11 is created.

In addition, a transition source frame row $F_{S2}$ and a transition destination frame row $F_{D2}$ for obtaining a reverse reproduction transition period TR12, or in other words, a transition period TR12 in which image transitioning is performed using reverse reproduction, from an interval FV12 that is in the vicinity of an initial end of the raw material moving image MT31 using DP matching, are established. Further, the images of each frame of the transition source frame row $F_{S2}$ and the transition destination frame row $F_{D2}$ are blended, and the transition period TR12 is created.

Furthermore, an interval from the frame that is immediately after the transition destination frame row $F_{D2}$ in the raw material moving image MT31 to the frame that is immediately prior to the transition source frame row $F_{S1}$ is cut out as it is, and set as a forward reproduction period TU11 of the looped moving image LP31.

In addition, an interval from the frame that is immediately prior to the transition source frame row $F_{S2}$ in the raw material moving image MT31 to the frame that is immediately prior to the transition destination frame row $F_{D1}$ is cut out, and the frames of the cut-out interval are lined up in order from new frame numbers to old frame numbers. Further, an interval that is formed from the frame rows that are obtained as a result thereof are set as a reverse reproduction period TU12 of the looped moving image LP31. The reverse reproduction period TU12 is an interval in which an interval of a portion of the raw material moving image MT31 is reproduced in a reverse direction.

Further, a moving image that is obtained by connecting the forward reproduction period TU11, the transition period TR11, the reverse reproduction period TU12 and the transition period TR12 in order is set as the looped moving image LP31.

Additionally, hereinafter, in order to simplify the description, the creation of a looped moving image that does not include reverse reproduction will be described.

[Configuration Example of Processing Apparatus]

Next, a specific embodiment in which the present technology is applied will be described.

Figure 10:
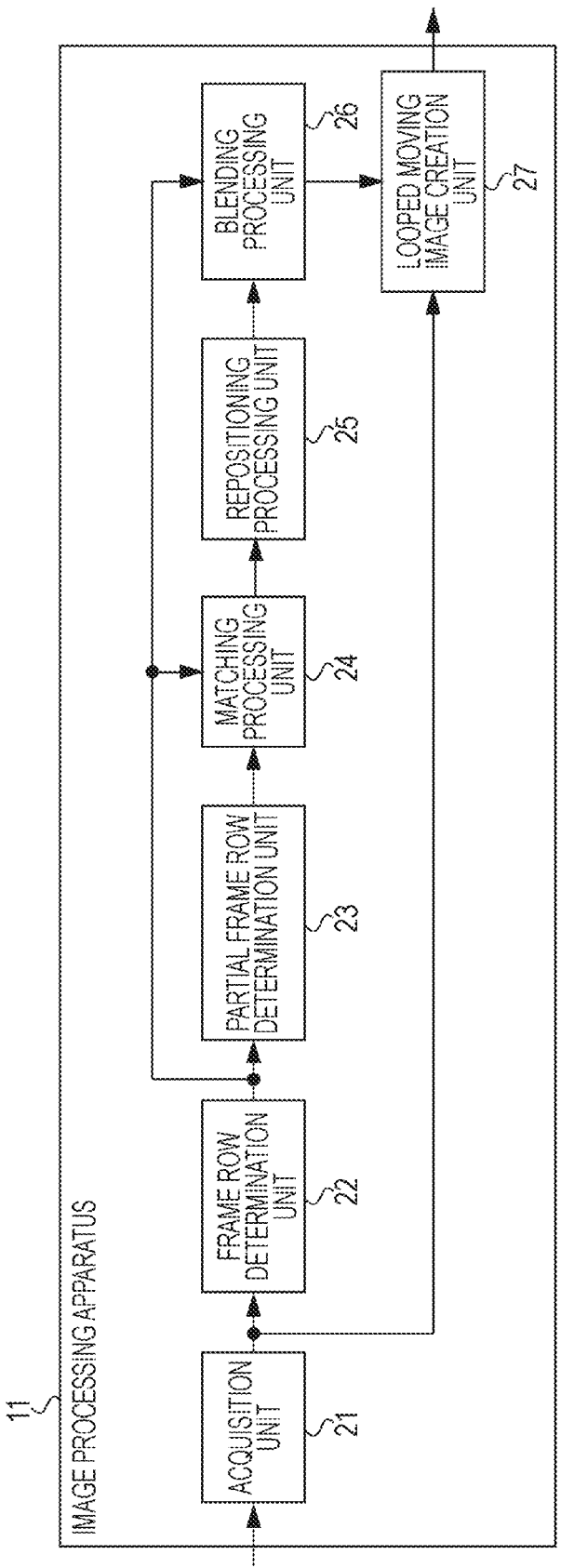
FIG. 10 is a diagram that indicates a configuration example of an image processing apparatus.

FIG. 10 is a diagram that shows a configuration example of an embodiment of an image processing apparatus in which the present technology is applied.

A image processing apparatus 11 in FIG. 10 is configured from an acquisition unit 21, a frame row determination unit 22, a partial frame row determination unit 23, a matching processing unit 24, a repositioning processing unit 25, a blending processing unit 26 and a looped moving image creation unit 27.

The acquisition unit 21 acquires a raw material moving image that is a raw material of a looped moving image that is to be created, and supplies the raw material moving image to the frame row determination unit 22 and the looped moving image creation unit 27.

The frame row determination unit 22 extracts a transition source frame row FS and a transition destination frame row FD from the raw material moving image that is supplied by the acquisition unit 21, and supplies the transition source frame row FS and the transition destination frame row FD to the partial frame row determination unit 23, the matching processing unit 24 and the blending processing unit 26.

The partial frame row determination unit 23 extracts a partial frame row FD' from the transition destination frame row FD that is supplied from the frame row determination unit 22, and supplies the partial frame row FD' to the matching processing unit 24.

The matching processing unit 24 performs elastic matching on the basis of the transition source frame row FS and the transition destination frame row FD from the frame row determination unit 22, and the partial frame row FD' from the partial frame row determination unit 23, and supplies the result of the matching to the repositioning processing unit 25.

The repositioning processing unit 25 performs a matching frame repositioning process on the basis of the result of the matching that is supplied from the matching processing unit 24, and supplies the result of the process to the blending processing unit 26.

The blending processing unit 26 performs a blending process on the basis of the result of the process from the repositioning processing unit 25 and the transition source frame row FS and the transition destination frame row FD from the frame row determination unit 22, creates each frame of a transition period that configures a looped moving image, and supplies the frames to the looped moving image creation unit 27.

The looped moving image creation unit 27 creates a looped moving image on the basis of each frame of the transition period from the blending processing unit 26 and the raw material moving image from the acquisition unit 21, and outputs the looped moving image.

[Description of Looped Moving Image Creation Process]

Figure 11:
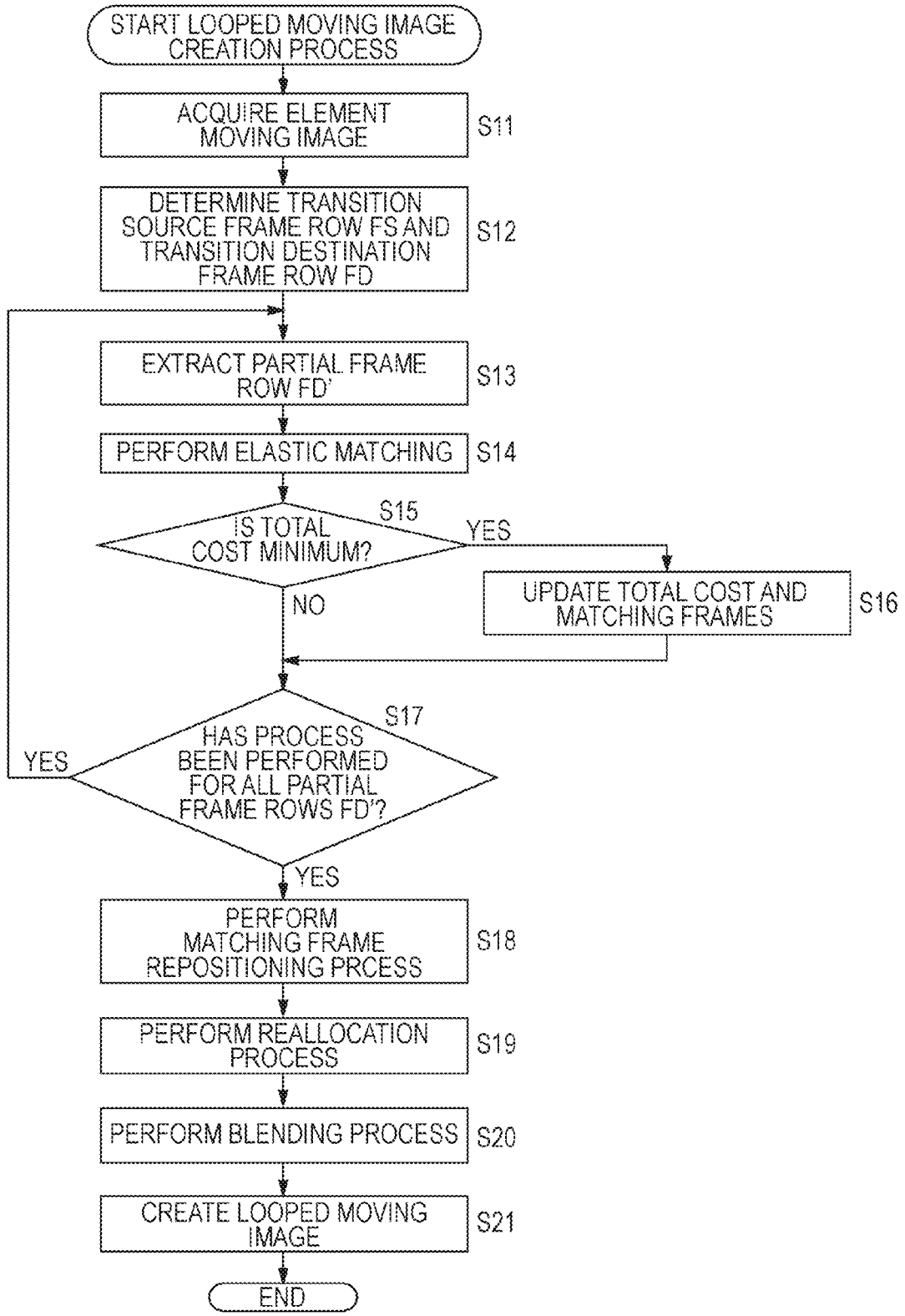
FIG. 11 is a flowchart that describes a looped moving image creation process.

Incidentally, when a raw material moving image is supplied to the image processing apparatus 11, and the creation of a looped moving image is indicated, a looped moving image creation process is performed by the image processing apparatus 11, and a looped moving image is created. Hereinafter, the looped moving image creation process due to the image processing apparatus 11 will be described with reference to the flowchart of FIG. 11.

In Step S11, the acquisition unit 21 acquires a supplied raw material moving image, and supplies the raw material moving image to the frame row determination unit 22 and the looped moving image creation unit 27.

In Step S12, the frame row determination unit 22 determines intervals of the transition source frame row FS and the transition destination frame row FD in the raw material moving image that is supplied by the acquisition unit 21, and supplies the transition source frame row FS and the transition destination frame row FD to the partial frame row determination unit 23, the matching processing unit 24 and the blending processing unit 26.

For example, a number of frames NF that configures each frame row of the transition source frame row FS and the transition destination frame row FD is established in advance. In this case, the frame row determination unit 22 sets an interval from the leading frame of the raw material moving image to an $NF^{th}$ frame as the transition destination frame row FD, and sets an interval that is formed from the last NF frames of the raw material moving image as the transition source frame row FS.

Additionally, the transition source frame row FS and the transition destination frame row FD may respectively be set so as to be extracted from different raw material moving images.

In Step S13, the partial frame row determination unit 23 extracts a partial frame row FD' from the transition destination frame row FD that is supplied from the frame row determination unit 22, and supplies the partial frame row FD' to the matching processing unit 24.

For example, the number of frames NF of the transition source frame row FS and the transition destination frame row FD, and the minimum number of frames NF_min of a transition period that is included in a looped moving image are set to be established in advance.

In this case, the partial frame row determination unit 23 determines partial frame rows FD' by changing the initiation position of the partial frame rows FD' between a $1^{st}$ and an $(NF- NF\_min)^{th}$ frame of the transition destination frame row FD, and also changing the length of the partial frame rows FD' between NF_min and NF frames. Therefore, since it is possible for a plurality of frame rows to become the partial frame rows FD', in Step S13, among the frame rows, frame rows that have not yet been set as a process target are set as partial frame rows FD'.

In Step S14, the matching processing unit 24 performs elastic matching on the basis of the transition source frame row FS and the transition destination frame row FD from the frame row determination unit 22, and the partial frame row FD' from the partial frame row determination unit 23.

For example, DP matching is performed as the elastic matching. In such a case, the matching processing unit 24 creates a DP planar surface on the basis of the transition source frame row FS and the transition destination frame row FD, and supplies a cost E (i, j, k) that is indicated by formula (3) to each edge of the DP planar surface. At this time, hypothetical initial points and hypothetical end points are supplied to the DP planar surface according to necessity.

Further, the matching processing unit 24 searches for a minimum cost pathway from the initial point to the end point of the DP planar surface, and calculates a total cost C (i, j, m) of the minimum cost pathway by calculating the formula (4). It can be said that the total cost that is obtained by the formula (4) is an evaluation value of the minimum cost pathway on the basis of the level of similarity of the images of each matching frame.

Additionally, the initial point on the DP planar surface is set as a position of a lattice point that is established by a leading frame of the transition source frame row FS and a leading frame of the partial frame row FD'. In the same manner, the end point on the DP planar surface is set as a position of a lattice point that is established by an ending frame of the transition source frame row FS and an ending frame of the partial frame row FD'.

In Step S15, the matching processing unit 24 determines whether or not the total cost C (i, j, m) of a minimum cost pathway that is obtained by the preceding process of Step S14 is the minimum. That is, it is determined whether or not the total cost C (i, j, m) of the minimum cost pathway that is obtained in the preceding process of Step S14 is smaller than the total costs C (i, j, m) of the minimum cost pathways that have been calculated for the partial frame rows FD' that have been set as process targets so far.

For example, among the total costs C (i, j, m) of the minimum cost pathways that have been calculated for the partial frame rows FD' that have been set as process targets so far, the matching processing unit 24 saves a total cost C (i, j, m) that is the smallest, and the matching frame from that time. Further, the matching processing unit 24 determines whether or not the total cost is the smallest in a case in which a total cost that has been newly calculated in the preceding Step S14 is smaller than a saved total cost.

In a case in which it is determined, in Step S15, that the total cost is the smallest, the matching processing unit 24 updates the saved total cost C (i, j, m) and the matching frame in a Step S16.

That is, the matching processing unit 24 discards a total cost and matching frame that had been saved up until this point, and saves the total cost of a newly calculated minimum cost pathway and a matching frame that is indicated by the minimum cost pathway.

By performing updates of the total cost of the minimum cost pathway and the matching frame in this manner, a matching frame in which the evaluation based on the total cost is the highest is obtained. When the update of the total cost and the matching frame has been performed, the subsequently process proceeds to a Step S17.

In addition, in a case in which it is determined, in Step S15, that the total cost is not the smallest, the process proceeds to Step S17 without performing an update of the total cost and matching frame.

If it is determined, in Step S15, that the total cost is not the smallest, or update of the total cost and the matching frame is performed in Step S16, the matching processing unit 24 determines whether or not the process has been performed for all of the partial frame rows FD' in Step S17.

In a case in which it is determined, in Step S17, that the process has not yet been performed for all of the partial frame rows FD', the process returns to Step S13, and the abovementioned processes are repeated.

In contrast to this, in a case in which it is determined, in Step S17, that the process has been performed for all of the partial frame rows FD', the matching processing unit 24 supplies the saved matching frame to the repositioning processing unit 25, and the process proceeds to a Step S18.

In Step S18, the repositioning processing unit 25 performs a matching frame repositioning process on the basis of the matching frame that is supplied from the matching processing unit 24, and supplies the result of the process to the blending processing unit 26.

For example, the repositioning processing unit 25 calculates a matching frame using interpolation in the manner described with reference to FIG. 8, as appropriate, and lines up a pair of frames of the transition source frame row FS and the transition destination frame row FD that is set as a matching frame in time sequence.

For example, as indicated by the arrow Q31 in FIG. 8, a pair of the frame $F_{S1}$ and the frame $F_{D2}$, a pair of the frame $F_{S4}$ and the frame $F_{D4}$, and a pair of the frame $F_{S5}$ and the frame $F_{D6}$ are calculated using interpolation, and as indicated by the arrow Q32, each frame pair is lined up.

Further, for each frame pair, the repositioning processing unit 25 relocates the layout of the frame pair in the manner indicated by the arrow Q33 on the basis of a time lag (frame gap) between the frames and a weighting between the frames.

In Step S19, the blending processing unit 26 performs a reallocation process of each frame pair on the basis of the result of the process of the repositioning processing unit 25.

For example, the blending processing unit 26 allocates a single frame pair to each time instant of the transition period in the manner described with reference to FIG. 8. As a result of this, as shown by the arrow Q34 of FIG. 8, a frame pair that is used in a blending process of a time instant is established for each time instant of the transition period.

In Step S20, the blending processing unit 26 performs a blending process on the basis of the allocation result of frame pair of each time instant of the transition period, and the transition source frame row FS and the transition destination frame row FD from the frame row determination unit 22, and creates an image of each frame of a transition period.

For example, for each time instant of the transition period, the blending processing unit 26 blends a frame pair that is allocated to the time instant, or in other words, an image of a frame of the transition source frame row FS and an image of a frame of the partial frame row FD' (the transition destination frame row FD), in the manner that is described with reference to FIG. 8, and sets the images of the frames of the transition period. As a result of this, the frame row of the transition period that is indicated by the arrow Q35 in FIG. 8, is obtained. The blending processing unit 26 supplies the obtained frame row of the transition period to the looped moving image creation unit 27.

In Step S21, the looped moving image creation unit 27 creates a looped moving image on the basis of the frame row of the transition period from the blending processing unit 26 and the raw material moving image from the acquisition unit 21.

For example, the looped moving image creation unit 27 creates a looped moving image by connecting the frame row of the transition period after a frame row of an interval between an ending frame of the transition destination frame row FD and a starting frame of the transition source frame row FS in the raw material moving image.

When the looped moving image is created, the looped moving image creation unit 27 outputs the created looped moving image, and the looped moving image creation process is completed. The looped moving image that is output from the image processing apparatus 11 is reproduced, stored on a recording medium or the like.

According to the abovementioned configuration, the image processing apparatus 11 calculates an optimal matching frame by performing matching of each partial frame row FD' and transition source frame row FS while changing the length of the partial frame rows FD' that are candidates for the final transition destination frame row FD and position of a leading frame thereof.

Further, the image processing apparatus 11 creates a frame row of the transition period using a blending process by adjusting the presentation position in the time direction of obtained matching frames, and creates a looped moving image using the frame row of the transition period.

By performing matching while changing the length of the partial frame rows FD' and position of a leading frame thereof in this manner, it is possible to obtain a more suitable pair as the pair of the transition source frame row FS and the transition destination frame row FD. As a result of this, it is possible to perform a transition of similar frames with a higher level of precision, and it is possible to obtain a higher quality of looped moving image as a result.

Incidentally, the abovementioned series of processes may be executed using hardware or may be executed using software. In a case in which the series of processes is executed using software, a program that configures the software is installed on a computer. In this instance, as a computer, it is possible to include a computer that is included in dedicated hardware, a general use personal computer that is capable of executing various functions due to various programs being installed thereon, and the like.

FIG. 12 is a block diagram that shows a configuration example of hardware of a computer that executes the abovementioned series of processes using a program.

In the computer, a Central Processing Unit (CPU) 201, Read Only Memory (ROM) 202, and Random Access Memory (RAM) 203 are mutually connected by a bus 204.

A input/output interface 205 is further connected to the bus 204. An input unit 206, and output unit 207, a storage unit 208, a communication unit 209 and a drive 210 are connected to the input/output interface 205.

The input unit 206 is formed from a keyboard, a mouse, a microphone, an imaging element or the like. The output unit 207 is formed from a display, a speaker of the like. The storage unit 208 is formed from a hard disk, non-volatile memory or the like. The communication unit 209 is formed from a network interface or the like. The drive 210 drives removable media 211 such as a magnetic disk, an optical disc, a magneto optical disc or semiconductor memory.

In a computer that is configured in the abovementioned manner, the abovementioned series of processes is performed by for example, the CPU 201 loading and executing a program, which is stored in the storage unit 208, in the RAM 203 through the input/output interface 205 and the bus 204.

A program that the computer (CPU 201) executes can for example, be provided stored on removable media 211 as package media or the like. In addition, the program can be provided through a wired or wireless transmission medium such as a local area network, the Internet or a digital satellite broadcast.

In the computer, the program can be installed on the storage unit 208 through the input/output interface 205 by mounting the removable media 211 to the drive 210. In addition, the program can be received by the communication unit 209 through a wired or wireless transmission medium and installed on the storage unit 208. In addition to this, the program can be installed on the ROM 202 or the storage unit 208 in advance.

Additionally, the program that the computer executes may be a program in which the processes are performed in time sequence in the order that is described in the present specification, or may be a program in which the processes are performed in parallel or at a required timing such as when an alert is performed.

In addition, the embodiment of the present technology is not limited to the abovementioned embodiment, and various alterations are possible within a range that does not depart from the scope of the present technology.

For example, the present technology can have a cloud computing configuration that processes a single function in cooperation by assigning the functions to a plurality of apparatuses through a network.

Further, in addition to being executed by a single apparatus, each step that is described in the abovementioned flowchart can be executed by being assigned to a plurality of apparatuses.

Furthermore, in a case in which a plurality of processes are included in a single step, in addition to being executed by a single apparatus, the plurality of processes that are included in the single step can be executed by being assigned to a plurality of apparatuses.

It is possible for the embodiments of the present technology to have the following configurations.

[1]

A image processing apparatus that creates a transition moving image in which, among a first moving image and a second moving image, an image transitions from one to the other, the image processing apparatus including a matching processing unit that searches for frame pairs of the first moving image and the second moving image which have similar images, on the basis of a level of similarity between images of frames that configure the first moving image and images of frames that configure the second moving image, a repositioning processing unit that repositions a plurality of the frame pairs in a time direction, which are lined up in time series, on the basis of a time lag of frames of the first moving image and a time lag of frames of the second moving image of mutually adjacent frame pairs, and a blending processing unit that creates the transition moving image by configuring an image of each frame that configures the repositioned frame pairs as an image of a frame of the transition moving image through blending thereof.

[2]

The image processing apparatus according to [1], in which frames of the first moving image and frames of the second moving image of the plurality of frame pairs, which are lined up in time series, are respectively lined up in a time series of ascending order or descending order.

[3]

The image processing apparatus according to [2], in which the repositioning processing unit performs the repositioning so that mutually adjacent frame pairs are positioned with a time lag that is obtained by adding a time lag of frames of the first moving image and a time lag of frames of the second moving image of mutually adjacent frame pairs with weight.

[4]

The image processing apparatus according to [3], in which the weighting of the time lag of frames of the first moving image that is used in the weighted addition is set as an average value of the weighting of each frame of the first moving image of mutually adjacent frame pairs, and the weighting of each frame of the first moving image is established so as to be as large as frames that are on a leading side of the first moving image.

[5]

The image processing apparatus according to any one of [1] to [4], in which, when a reproduction speed of the second moving image with respect to the first moving image is changed with a predetermined frame pair as a point of origin, the matching processing unit configures any one of several pairs of reproduction speed frames as the frame pair that is adjacent to the predetermined frame pair, on the basis of the level of similarity between a pair of frames of the first moving image and the second moving image that should be presented at the same time.

[6]

The image processing apparatus according to any one of [1] to [5], in which the matching processing unit calculates the plurality of frame pairs, which are lined up in time series, for a plurality of first moving images with mutually different lengths, and the blending processing unit creates the transition moving image using a frame pair, among the plurality of frame pairs that were calculated for each first moving image, in which an evaluation based on the level of similarity for each frame is the highest.

[7]

The image processing apparatus according to any one of [1] to [6], further including a looped moving image creation unit that creates a looped moving image on the basis of the transition moving image.

REFERENCE SIGNS LIST 11 image processing apparatus
22 frame row determination unit
23 partial frame row determination unit
24 matching processing unit
25 repositioning processing unit
26 blending processing unit
27 looped moving image creation unit

The invention claimed is:

1. A image processing apparatus that creates a transition moving image in which, among a first moving image and a second moving image, an image transitions from one to the other, the image processing apparatus comprising:
   a matching processing unit that searches for frame pairs of the first moving image and the second moving image which have similar images, on the basis of a level of similarity between images of frames that configure the first moving image and images of frames that configure the second moving image;
   a repositioning processing unit that repositions a plurality of the frame pairs in a time direction, which are lined up in time series, on the basis of a time lag of frames of the first moving image and a time lag of frames of the second moving image of mutually adjacent frame pairs; and
   a blending processing unit that creates the transition moving image by configuring an image of each frame that configures the repositioned frame pairs as an image of a frame of the transition moving image through blending thereof.

2. The image processing apparatus according to claim 1, wherein frames of the first moving image and frames of the second moving image of the plurality of frame pairs, which are lined up in time series, are respectively lined up in a time series of ascending order or descending order.

3. The image processing apparatus according to claim 2, wherein the repositioning processing unit performs the repositioning so that mutually adjacent frame pairs are positioned with a time lag that is obtained by adding a time lag of frames of the first moving image and a time lag of frames of the second moving image of mutually adjacent frame pairs with weight.

4. The image processing apparatus according to claim 3, wherein the weighting of the time lag of frames of the first moving image that is used in the weighted addition is set as an average value of the weighting of each frame of the first moving image of mutually adjacent frame pairs, and
   the weighting of each frame of the first moving image is established so as to be as large as frames that are on a leading side of the first moving image.

5. The image processing apparatus according to claim 2, wherein, when a reproduction speed of the second moving image with respect to the first moving image is changed with a predetermined frame pair as a point of origin, the matching processing unit configures any one of several pairs of reproduction speed frames as the frame pair that is adjacent to the predetermined frame pair, on the basis of the level of similarity between a pair of frames of the first moving image and the second moving image that should be presented at the same time.

6. The image processing apparatus according to claim 2, wherein the matching processing unit calculates the plurality of frame pairs, which are lined up in time series, for a plurality of first moving images with mutually different lengths, and the blending processing unit creates the transition moving image using a frame pair, among the plurality of frame pairs that were calculated for each first moving image, in which an evaluation based on the level of similarity for each frame is the highest.

7. The image processing apparatus according to claim 2, further comprising:
a looped moving image creation unit that creates a looped moving image on the basis of the transition moving image.

8. A image processing method that creates a transition moving image in which, among a first moving image and a second moving image, an image transitions from one to the other, the image processing method comprising the steps of:
searching for frame pairs of the first moving image and the second moving image which have the similar images, on the basis of a level of similarity between images of frames that configure the first moving image and images of frames that configure the second moving image;
repositioning a plurality of the frame pairs in a time direction, which are lined up in time series, on the basis of a time lag of frames of the first moving image and a time lag of frames of the second moving image of mutually adjacent frame pairs; and
creating the transition moving image by configuring an image of each frame that configures the repositioned frame pairs as an image of a frame of the transition moving image through blending thereof.

9. A non-transitory computer-readable storage medium, having stored thereon, a set of computer-executable instructions for image processing that creates a transition moving image in which, among a first moving image and a second moving image, an image transitions from one to the other, causing a computer to perform the steps comprising:
searching for frame pairs of the first moving image and the second moving image which have the similar images, on the basis of a level of similarity between images of frames that configure the first moving image and images of frames that configure the second moving image;
repositioning a plurality of the frame pairs in a time direction, which are lined up in time series, on the basis of a time lag of frames of the first moving image and a time lag of frames of the second moving image of mutually adjacent frame pairs; and
creating the transition moving image by configuring an image of each frame that configures the repositioned frame pairs as an image of a frame of the transition moving image through blending thereof.

* * * * *